(12) United States Patent
Matsumoto

(10) Patent No.: US 8,081,248 B2
(45) Date of Patent: Dec. 20, 2011

(54) SOLID-STATE IMAGE PICKUP DEVICE AND CAMERA SYSTEM

(75) Inventor: Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 12/190,170

(22) Filed: Aug. 12, 2008

(65) Prior Publication Data

US 2009/0046190 A1 Feb. 19, 2009

(30) Foreign Application Priority Data

Aug. 13, 2007 (JP) ................................. 2007-210868

(51) Int. Cl.
*H04N 5/335* (2011.01)
*H04N 5/225* (2006.01)

(52) U.S. Cl. ........................................ 348/308; 348/340

(58) Field of Classification Search .................. 348/308, 348/340
See application file for complete search history.

(56) References Cited

U.S. PATENT DOCUMENTS

| | | | | |
|---|---|---|---|---|
| 4,484,223 | A * | 11/1984 | Tsunekawa | 348/245 |
| 6,667,769 | B2 * | 12/2003 | Harton et al. | 348/308 |
| 7,015,973 | B2 * | 3/2006 | Kim | 348/536 |
| 2003/0063220 | A1 * | 4/2003 | Kim | 348/572 |
| 2003/0081134 | A1 * | 5/2003 | Luo et al. | 348/308 |
| 2004/0183932 | A1 * | 9/2004 | Kasuga | 348/301 |
| 2005/0151079 | A1 * | 7/2005 | Elkind et al. | 250/333 |
| 2006/0001750 | A1 * | 1/2006 | Mizuguchi et al. | 348/294 |
| 2006/0232676 | A1 * | 10/2006 | Boemler | 348/172 |
| 2008/0084341 | A1 * | 4/2008 | Boemler | 341/143 |

FOREIGN PATENT DOCUMENTS

| | | |
|---|---|---|
| JP | 2005-278135 | 10/2005 |
| JP | 2007-104240 | 4/2007 |

OTHER PUBLICATIONS

Japanese Office Action issued on Jun. 9, 2009 in connection with JP Application No. 2007210868.
W. Yang "An Integrated 800×600 CMOS Image System," ISSCC Digest of Technical Papers, pp. 304-305, Feb. 1999.

* cited by examiner

*Primary Examiner* — Lin Ye
*Assistant Examiner* — Amy Hsu
(74) *Attorney, Agent, or Firm* — SNR Denton US LLP

(57) ABSTRACT

A solid-state image pickup device includes a pixel array including a plurality of pixels arranged in a matrix, and a pixel signal read-out circuit for reading out a pixel signal from the pixel array in units of a plurality of pixels. The pixel signal read-out circuit includes a plurality of comparators and a plurality of counters. The comparators are disposed to correspond to a column of the pixels, and compare a read-out signal potential and a reference voltage to generate a determination signal and output the determination signal. The counters are controlled by outputs of the comparators. Each of the counters is configured to count a comparison time of a corresponding comparator of the comparators. The counters have a different operation period for each one or a plurality of columns.

7 Claims, 20 Drawing Sheets

FIG. 4
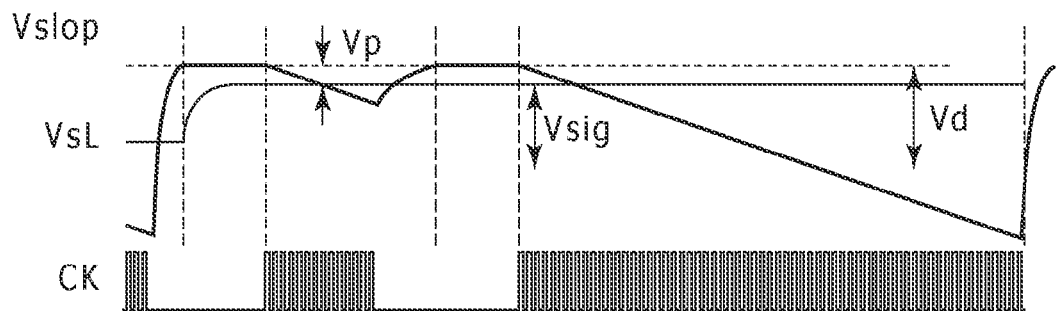
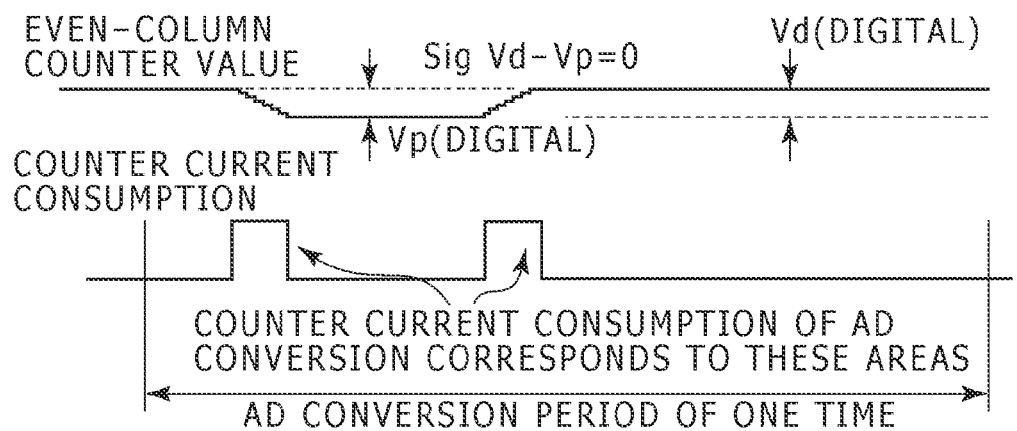
FIG. 5
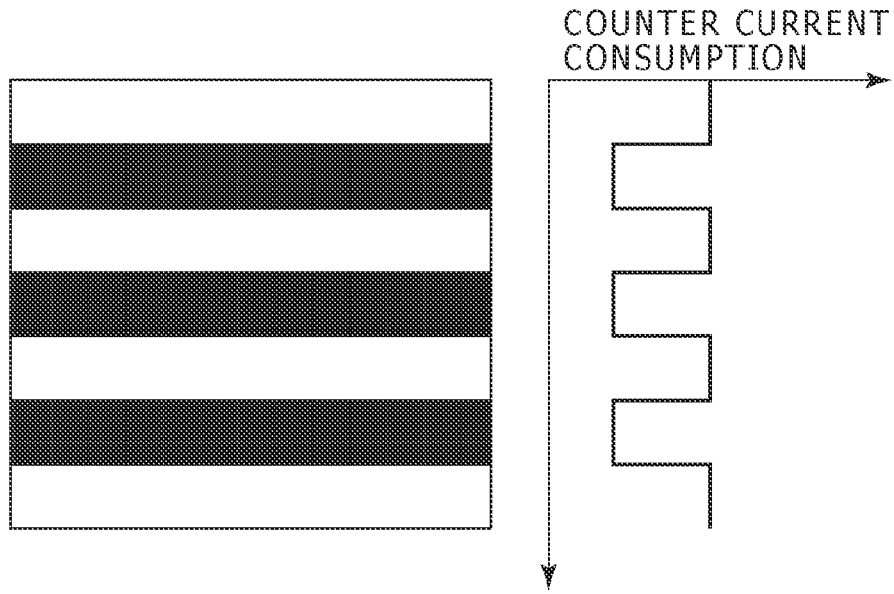

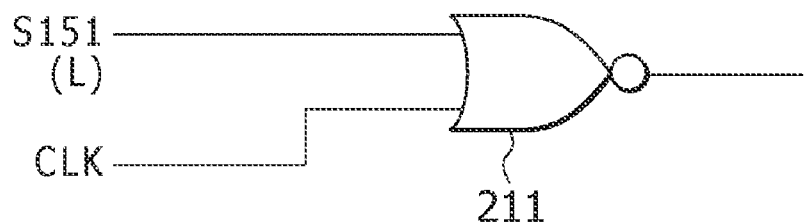
FIG. 9A
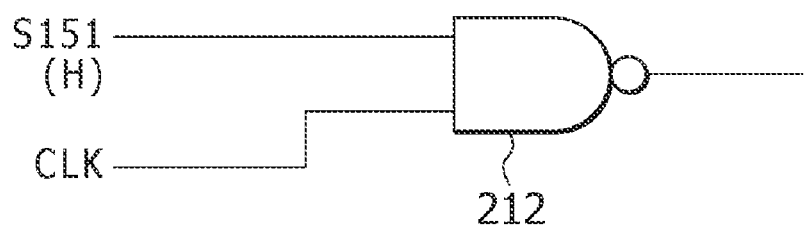
FIG. 9B
FIG. 10
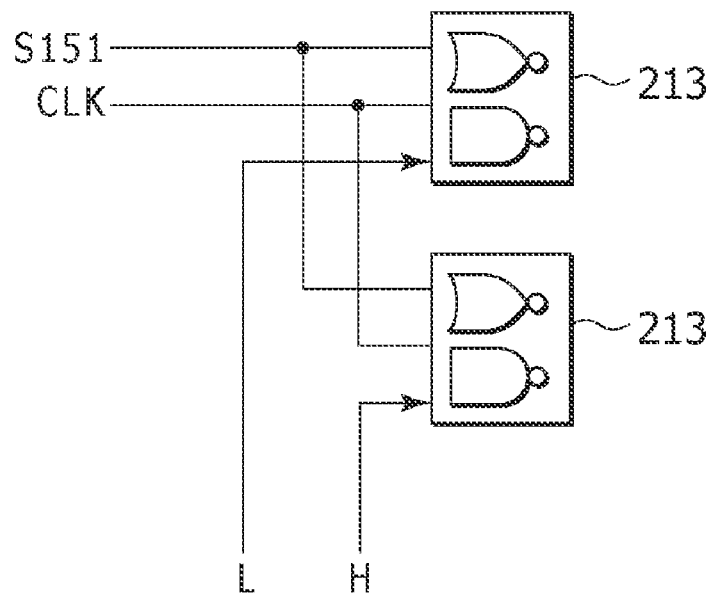

FIG. 11
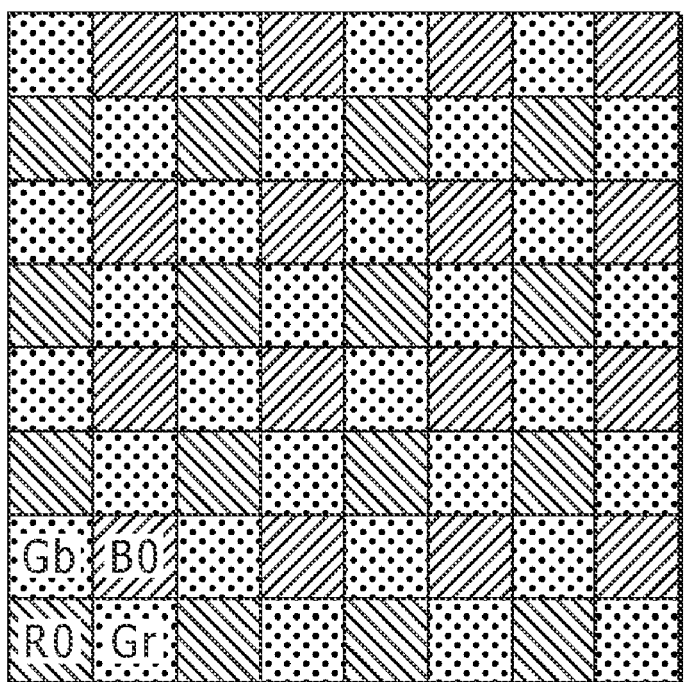
ADJACENT PIXELS HAVING THE SAME COLOR HAVE CLOSE VALUES
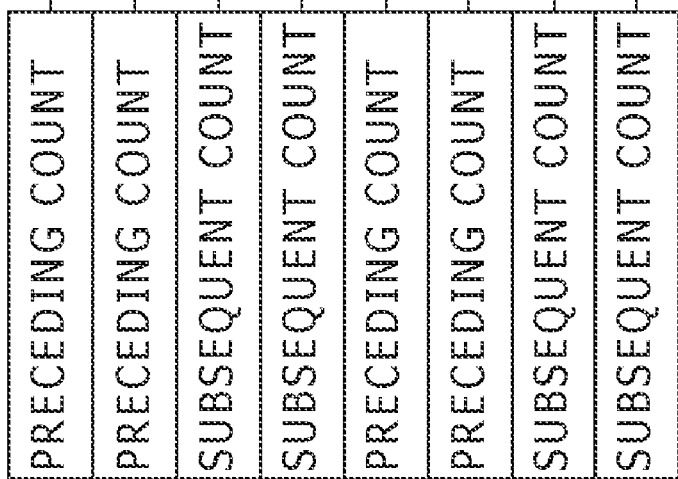
152 COUNTER

US 8,081,248 B2

SOLID-STATE IMAGE PICKUP DEVICE AND CAMERA SYSTEM

CROSS-REFERENCE TO RELATED APPLICATIONS

The present application claims benefit of priority of Japanese patent Application No. 2007-210868 filed in the Japanese Patent Office on Aug. 13, 2007, the entire disclosure of which is incorporated herein by reference.

BACKGROUND OF THE INVENTION

1. Field of the Invention

The present invention relates to a solid-state image pickup device represented by a CMOS image sensor, and a camera system.

2. Description of Related Art

Recently, as a solid-state image pickup device (an image sensor) in place of a CCD, a CMOS image sensor has attracted attention.

The reason for this is that the CMOS image sensor solves problems inherent in the CCD in that manufacturing of CCD pixels requires a dedicated process, an operation for a plurality of power supply voltages, and the operation requires a combination of a plurality of peripheral ICs to highly complicate the system.

The CMOS image sensor has a plurality of effective merits in that: for the manufacturing, a manufacturing process similar to that of a general CMOS integrated circuit may be used; the CMOS image sensor may be driven by a single power-supply; and an analog circuit and a logical circuit using the CMOS process may coexist within an identical chip, thereby reducing the number of peripheral ICs.

For an output circuit of the CCD, a 1-channel (ch) output using an FD amplifier having a floating diffusion (FD) layer is mainly used.

On the other hand, the CMOS image sensor has an FD amplifier for each pixel. For output thereof, a column parallel outputting scheme, in which one row in a pixel array is selected, and pixels in the row are simultaneously read out in a column direction, is mainly used.

The reason for this is that it is difficult for the FD amplifier disposed in the pixel to provide a sufficient driving capability, and therefore, a reduction in data rate becomes necessary, and the parallel processing is advantageous.

A description is given of a general CMOS image sensor below.

FIG. 1 is a diagram showing one example of a pixel of the CMOS image sensor including four transistors.

A pixel 10 includes a photodiode 11 as a photoelectric conversion element, for example. For this one photodiode 11, the pixel 10 includes four transistors as active devices, which are a transfer transistor 12, an amplifier transistor 13, a selection transistor 14, and a reset transistor 15.

The photodiode 11 photoelectrically converts an incident light into an electric charge (in this case, an electron) having an amount which corresponds to an amount of the incident light.

The transfer transistor 12 is connected between the photodiode 11 and a floating diffusion FD. A gate (transfer gate) of the transfer transistor 12 is applied a drive signal through a transfer control line LTx, whereby the transfer transistor 12 transfers the photoelectrically converted electron at the photodiode 11 to the floating diffusion FD.

A gate of the amplifier transistor 13 is connected to the floating diffusion FD. The amplifier transistor 13 is connected via the selection transistor 14 to a signal line LSGN. A source follower is constituted by the amplifier transistor 13 and the constant current source 16 outside a pixel array.

An address signal is applied to a gate of the selection transistor 14 through a selection control line LSEL. When the selection transistor 14 is turned on, the amplifier transistor 13 amplifies a potential of the floating diffusion FD and outputs voltage corresponding to the potential to the output (vertical) signal line LSGN. A signal voltage outputted from each pixel through the signal line LSGN is outputted to a pixel signal read-out circuit.

The reset transistor 15 is connected between a power supply line LVDD and the floating diffusion FD. When a reset signal is applied to a gate of the reset transistor 15 through a reset control line LRST, the reset transistor 15 resets the potential of the floating diffusion FD to a potential of the power supply line LVDD.

More specifically, when the pixel is reset, the transfer transistor 12 is turned on to electrically clear electric charges accumulated in the photodiode 11. Subsequently, the transfer transistor 12 is turned off, the photodiode 11 converts a light signal into an electric charge, and accumulates the electric charge.

Upon reading out, the reset transistor 15 is turned on to reset the floating diffusion FD, the reset transistor 15 is turned off, and voltage of the floating diffusion FD at this time is outputted through the amplifier transistor 13 and the selection transistor 14. The output at this time is P-phase output.

Subsequently, the transfer transistor 12 is turned on to transfer the electric charges accumulated in the photodiode 11 to the floating diffusion FD, and the voltage of the floating diffusion FD at this time is outputted by the amplifier transistor 13. The output at this time is D-phase output.

When a difference between the D-phase output and the P-phase output is used as an image signal, not only a deviation of a DC component of the output for each pixel but also FD reset noise of the floating diffusion may be removed from the image signal.

These operations are performed simultaneously for each pixel of one row because the respective gates of the transfer transistor 12, the selection transistor 14, and the reset transistor 15 are connected in units of rows, for example.

Various proposals have been made regarding a pixel-signal reading out (output) circuit of the CMOS image sensor of the column parallel output type. One of the most advanced mode thereof is of type which is provided with an analog-digital converter (hereinafter, abbreviated as an ADC (Analog digital converter)) for each column and which extracts a pixel signal as a digital signal.

The CMOS image sensor including the column parallel ADC mounted thereon is disclosed, for example, in W. Yang, et al., "An Integrated 800×600 CMOS Image System", ISSCC Digest of Technical Papers, pp. 304 to 305, February, 1999, or in Japanese Unexamined Patent Application Publication No. 2005-278135.

FIG. 2 is a block diagram showing a configuration example of a solid-state image pickup device (CMOS image sensor) including a column parallel ADC mounted thereon.

As shown in FIG. 2, a solid-state image pickup device 20 includes a pixel array 21 as an imaging unit, a vertical scanning circuit 22, a horizontal transfer scanning circuit 23, a timing control circuit 24; a group of ADCs 25, a digital-analog converter (hereinafter, abbreviated as a DAC (Digital-Analog converter)) 26, an amplifier circuit (S/A) 27, and a signal processing circuit 28.

The pixel array 21 includes a photodiode and an amplifier within the pixel, and is configured to arrange the pixels in a matrix manner, shown in FIG. 1, for example.

The solid-state image pickup device 20 includes a control circuit for successively reading out a signal of the pixel array 21. The control circuit includes the timing control circuit 24 for generating an internal clock, the vertical scanning circuit 22 for controlling a row address or row scanning, and the horizontal transfer scanning circuit 23 for controlling a column address or column scanning.

The group of ADCs 25 is formed by ADCs disposed in a plurality of columns. The ADCs includes comparators 25-1, counters 25-2, and latches 25-3. The comparators compare a reference voltage Vslop which is a ramp waveform (RAMP) obtained by varying stepwise a reference voltage generated by the DAC 26 and analog signals obtained via passing through vertical signal lines from the pixels for each row line. The counters count a comparing time. The latches hold a count result. The group of ADCs 25 has an n-bit digital signal conversion function and has each of the ADCs disposed for each vertical signal line (column line), thereby constituting column parallel ADC blocks.

Outputs of the respective latches 25-3 are connected to a horizontal transfer line 29 having a width of 2n bits, for example.

Further, 2n of amplifier circuits 27 corresponding to the horizontal transfer line 29 and a signal processing circuit 28 are disposed.

In the group of ADCs 25, analog signals (potentials Vsl) read out to the vertical signal lines are compared with the reference voltage Vslop (sloped waveform which changes to a linear shape having a certain gradient) at the comparators 25-1 disposed for each column.

At this time, the counters 25-2 disposed for each column similarly to the comparators 25-1 are operated, and when the reference voltages Vslop having a ramp waveform and counter values are changed on a one-to-one association basis, the potential (analog signal) Vsl of the vertical signal lines is converted into a digital signal.

The change of the reference voltage Vslop is to convert a change in voltage into a change in time, and the time is counted in a certain cycle (clock), thereby performing a conversion into the digital value.

When the potential Vsl of an analog electrical signal and the reference voltage Vslop cross, the outputs of the comparators 25-1 are inverted to stop input clocks of the counters 25-2. Thus, the AD conversion is completed.

After the above-described AD conversion period is ended, by the horizontal transfer scanning circuit 23, data held in the latches 25-3 are inputted to the signal processing circuit 28 via the horizontal transfer line 29 and the amplifier circuit 27. As a result, a two-dimensional image is generated.

As described above, the column parallel outputting process is performed.

SUMMARY OF THE INVENTION

In a solid-state image pickup device used as a device, such as a digital still camera, which converts light into an electrical signal and outputs an image signal, along with an increased number of pixels or a high frame rate, a high-speed reading out or a low power consumption has recently become a required technology.

As described above, the MOS (CMOS) image sensor, which is one of the solid-state image pickup devices, takes advantage of a characteristic that the image sensor may be manufactured according to a similar process as that of a CMOS integrated circuit to convert an electric charge into an electrical signal for each pixel and to process in parallel the electrical signal read out from the pixel for each column, thereby improving on a reading out speed.

On the other hand, when the electrical signal is processed in parallel for each column, a high speed may be achieved. However, due to an increase in current or a regional current concentration resulting from concentration of a current consumed by a circuit at a time of the parallel process, a problem that variations are caused in a power supply is arisen.

This problem is further studied.

An operation of the above-described counters and a current consumed by the counters are described in association with FIG. 3 and FIG. 4.

FIG. 3 is a chart showing a state in a scene where an imaged subject is relatively bright.

A signal is accumulated in a pixel according to the brightness, and when reading out, the vertical-signal-line potential Vsl is decreased than a reset level, as shown in FIG. 3. A read-out circuit performs A/D conversion of the signal change.

In this case, the current consumption of the counter is generated in a period during which the counter is operated, i.e., until a point where the signal potential Vsl read out to the vertical signal line and the reference voltage Vslop cross. At a point when the counter stops, the current to be consumed becomes nearly zero.

A current consumed by the counter in one time of AD conversion corresponds to a total of instantaneous currents shown in FIG. 3, i.e., areas shown in FIG. 3.

In FIG. 3, the counter operates twice, i.e., at a time of reading out a reset level of the pixel and at a time of reading out a signal level, and operates to take out difference data obtained therefrom. However, this is one example, and the counter may be configured to operate at a time of reading out the signal level only.

FIG. 4 is a chart showing a state in a scene where the imaged subject is dark.

At this time, the vertical-signal-line potential Vsl and the reference voltage Vslop cross immediately. Thus, an operation period of the counter is short and the current (a total of instantaneous currents shown in FIG. 4) of the counter consumed in one time of reading out decreases.

Thus, the period during which the counter operates varies according to a signal amount, and the current consumption also varies according to the signal. That is, in the AD conversion performed once for each row, the current consumptions of a total of all columns vary depending on each row.

FIG. 5 is a diagram showing a current consumption of the counter when an image in which there are changes of white, black, white, black in a vertical direction is imaged.

In a period during which white is photographed, the current consumption of the counter becomes maximum, and in a period during which black is photographed, the current consumption becomes minimum.

Thus, the column total current consumption of the counter varies for each row according to the brightness, and the variation differs depending on the signal. Accordingly, the variations are caused in the power supply at complete non-fixed intervals, so that the power supply variations may be returned to the read-out circuit, which may deteriorate the picture.

To solve a current load fluctuation like this, measures for smoothing the fluctuation by increasing an external capacitance has been generally taken. However, recently, since the image sensor is often implemented in a mobile device such as a portable telephone, the external capacitance is made smaller or reduced while there is a request for miniaturization also as a module. Thus, there is a tendency that it may not to rely on the above-described measures.

Accordingly, it is desirable to provide a solid-state image pickup device capable of alleviating a current concentration generated when a simultaneous parallel process is performed to achieve a current smoothing, and inhibiting a power supply fluctuation, and a camera system using the solid-state image pickup device.

In accordance with a first aspect of the present invention, a solid-state image pickup device is provided which includes a pixel array including a plurality of pixels arranged in a matrix and a pixel signal read-out circuit for reading out a pixel signal from the pixel array in units of pixels. Each of the pixels performs a photoelectric conversion. The pixel signal read-out circuit includes a plurality of comparators and a plurality of counters whose operations are controlled by outputs of the comparators. The comparators are disposed to correspond to a column of the pixels. Each of the counters compares a read-out signal potential and a reference voltage to generate a determination signal and outputs the determination signal. Each of the counters is configured to count a comparison time of a corresponding comparator of the plurality of comparators. The plurality of counters have a different operation period for each one or a plurality of columns.

In accordance with a second aspect of the present invention, there is provided a camera system which includes a solid-state image pickup device and an optical system for imaging a subject image onto the image pickup device. The solid-state image pickup device includes a pixel array in which a plurality of pixels are arranged in a matrix, each pixel being configured to perform a photoelectric conversion, and a pixel-signal read-out circuit for reading out a pixel signal from the pixel array in units of a plurality of pixels. The pixel signal read-out circuit includes a plurality of comparators and a plurality of counters of which operations are controlled by outputs of the comparators. The comparators are disposed to correspond to a column arrangement of the pixels. Each of the counters compares a read-out signal potential and a reference voltage to generate a determination signal and outputs the determination signal. Each of the plurality of counters is configured to count a comparison time of a corresponding comparator. The counters have a different operation period for each one or a plurality of columns.

Preferably, the comparators may invert an output level when the read-out signal potential agrees with the reference voltage. The plurality of counters, disposed for each column, having a different operation period may include first counters each configured to operate until an output of the corresponding comparator is inverted; and second counters each configured to operate after an output of the corresponding comparator is inverted.

The first counters and the second counters may alternately disposed for each color.

The first counters and the second counters may be alternately disposed for each of the pixel columns to correspond to a plurality of pixel columns which are adjacent same color series, in which the plurality of pixel columns have close values.

One of the first counters and the second counter may perform an up-count operation, and the other thereof may perform a down-count operation.

The pixel signal read-out circuit may include a clock transmission controlling unit for controlling a transmission of a clock to the first counters or the second counters. When a clock of the first counter is transmitted, the clock transmission controlling unit may transmit the clock until the output of the corresponding comparator is inverted, and stops the transmission of the clock in response to the inversion of the output of the comparator. When a clock of the second counter is transmitted, the clock transmission controlling unit may stop the transmission of the clock until the output of the comparator is inverted, and transmits the clock in response to the inversion of the output of the comparator.

A signal processing unit for performing an image processing on the signal read out by the pixel signal read-out circuit may be provided. The signal processing unit may perform intensively an image signal processing in a period other than an operation period of the counters.

According to an embodiment of the present invention, in the pixel signal read-out circuit, a read-out signal potential and a reference voltage are determined by comparison, and a determination signal obtained by the determining is outputted. In the counters, operations are controlled by the outputs of the comparators, and comparison times of the corresponding comparators are counted.

At this time, the plurality of counters differ in operation period in units of one or a plurality of columns, and a current concentration generated when a simultaneous parallel process is performed is alleviated so that the current is smoothed.

According to an embodiment of the present invention, it may alleviate a current concentration generated at a time that a simultaneous parallel process is performed thereby to achieve a current smoothing, thereby enabling inhibition of a power supply fluctuation.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 4 is a chart for describing the operation of the counter and the current consumed by the counter, and is a chart showing a state in a scene where the imaged subject is dark;

FIG. 5 is a diagram showing the current consumption of the counter when an image in which there are changes of white, black, white, black in a vertical direction is imaged;

FIGS. 9A and 9B are diagrams each showing a configuration example of a gate block in FIG. 8;

FIG. 10 is a diagram showing a configuration which deals with a preceding count and a subsequent count switched according to set data;

FIG. 11 is a diagram for describing a configuration example in which the preceding count and the subsequent count are alternately performed by each two columns because adjacent same-color pixels have a close value;

DETAILED DESCRIPTION OF EMBODIMENTS

In association with drawings, embodiments of the present invention are described below.

Figure 6:
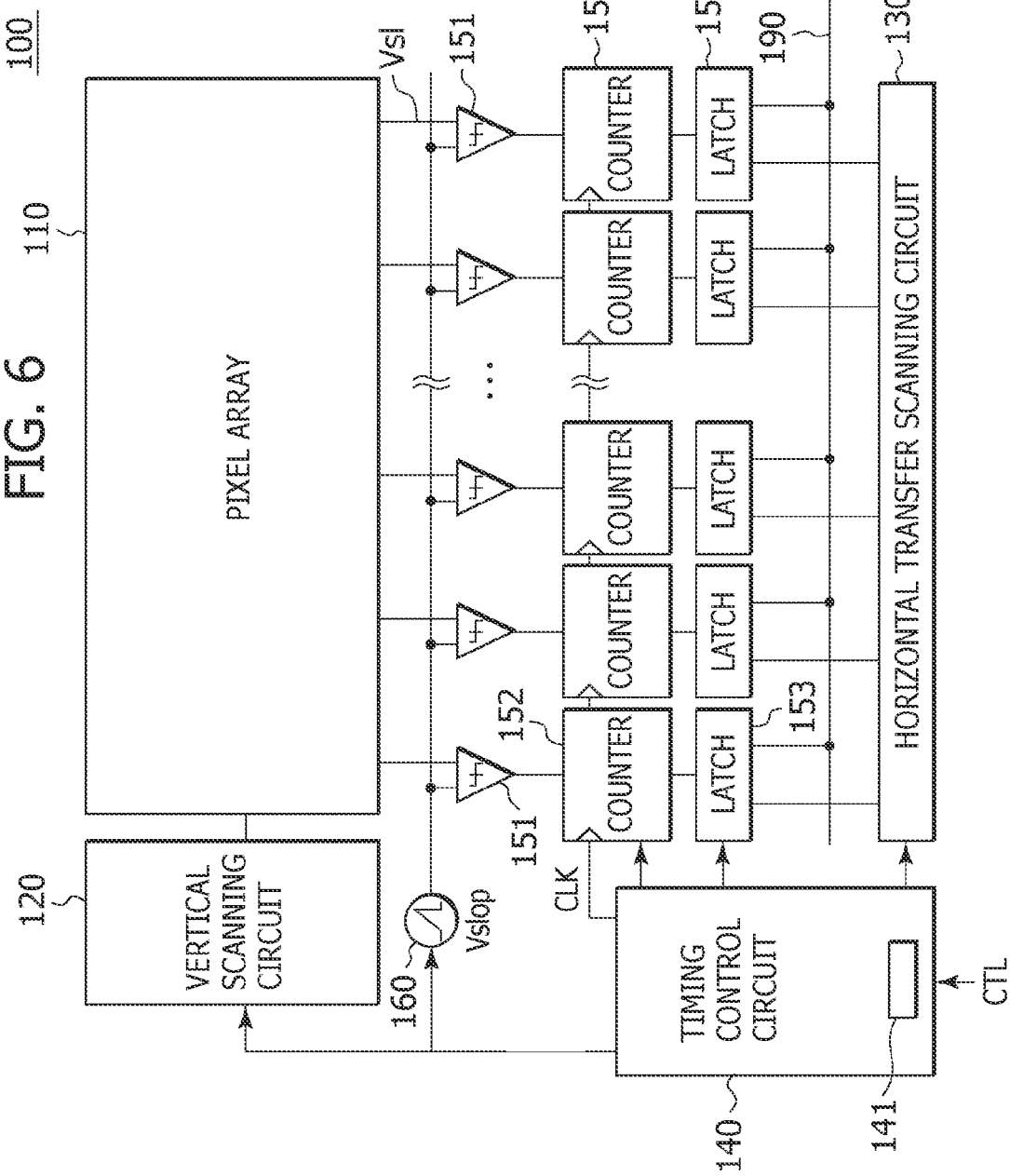
FIG. 6 is a block diagram showing a configuration example of a solid-state image pickup device (CMOS image sensor) including a column parallel ADC mounted thereon according to a first embodiment of the present invention.

FIG. 6 is a block diagram showing a configuration example of a solid-state image pickup device (CMOS image sensor) including a column parallel ADC mounted thereon according to a first embodiment of the present invention.

As shown in FIG. 6, a solid-state image pickup device 100 includes a pixel array 110 as an imaging unit, a vertical scanning circuit 120, a horizontal transfer scanning circuit 130, a timing control circuit 140, a group of ADCs 150 as a pixel signal read-out circuit, a DAC (digital-analog converter) 160, an amplifier circuit (S/A) 170, a signal processing circuit 180, and a horizontal transfer line 190.

Figure 1:
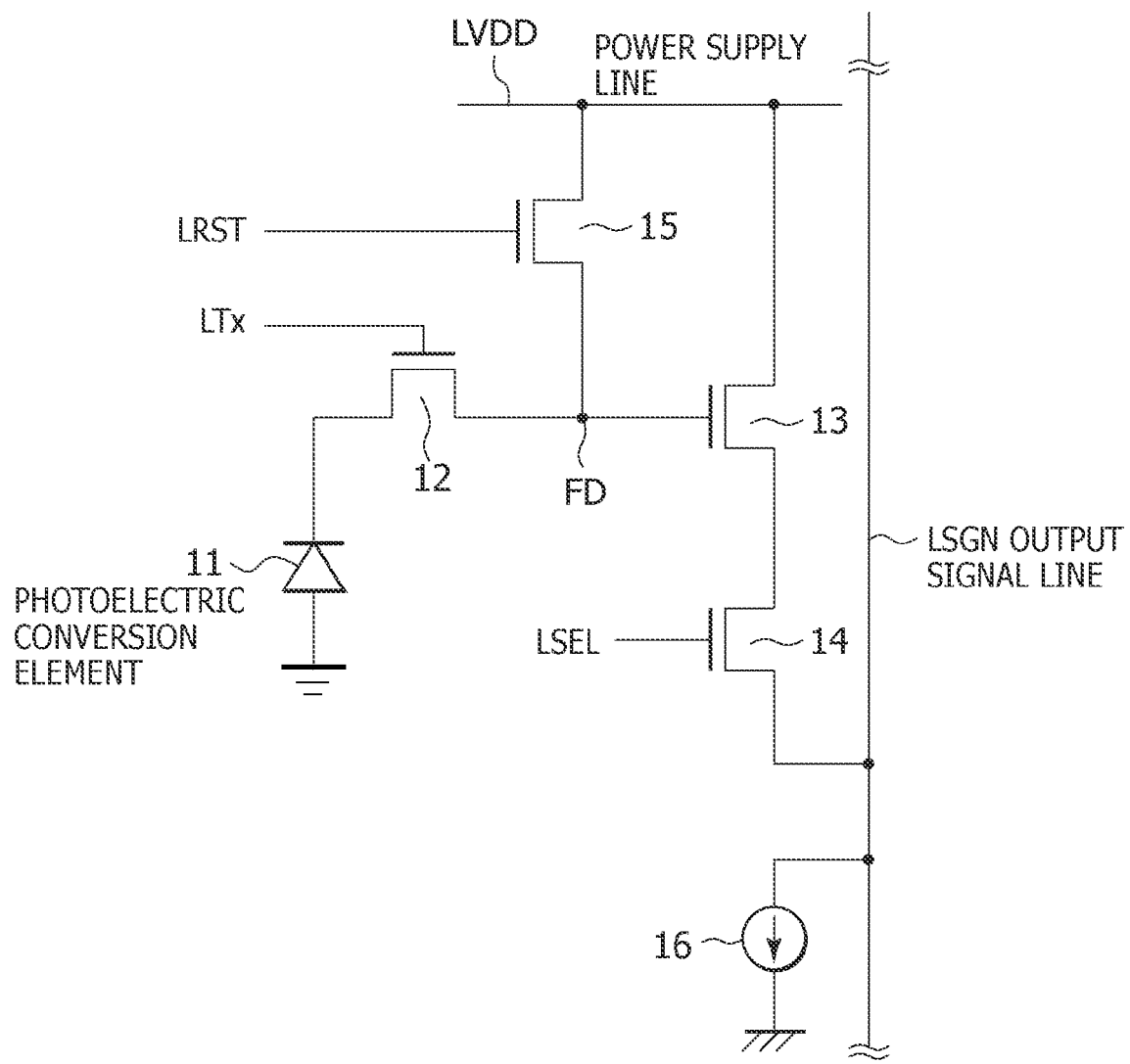
FIG. 1 is a diagram showing one example of a pixel of a CMOS image sensor including four transistors.
Figure 2:
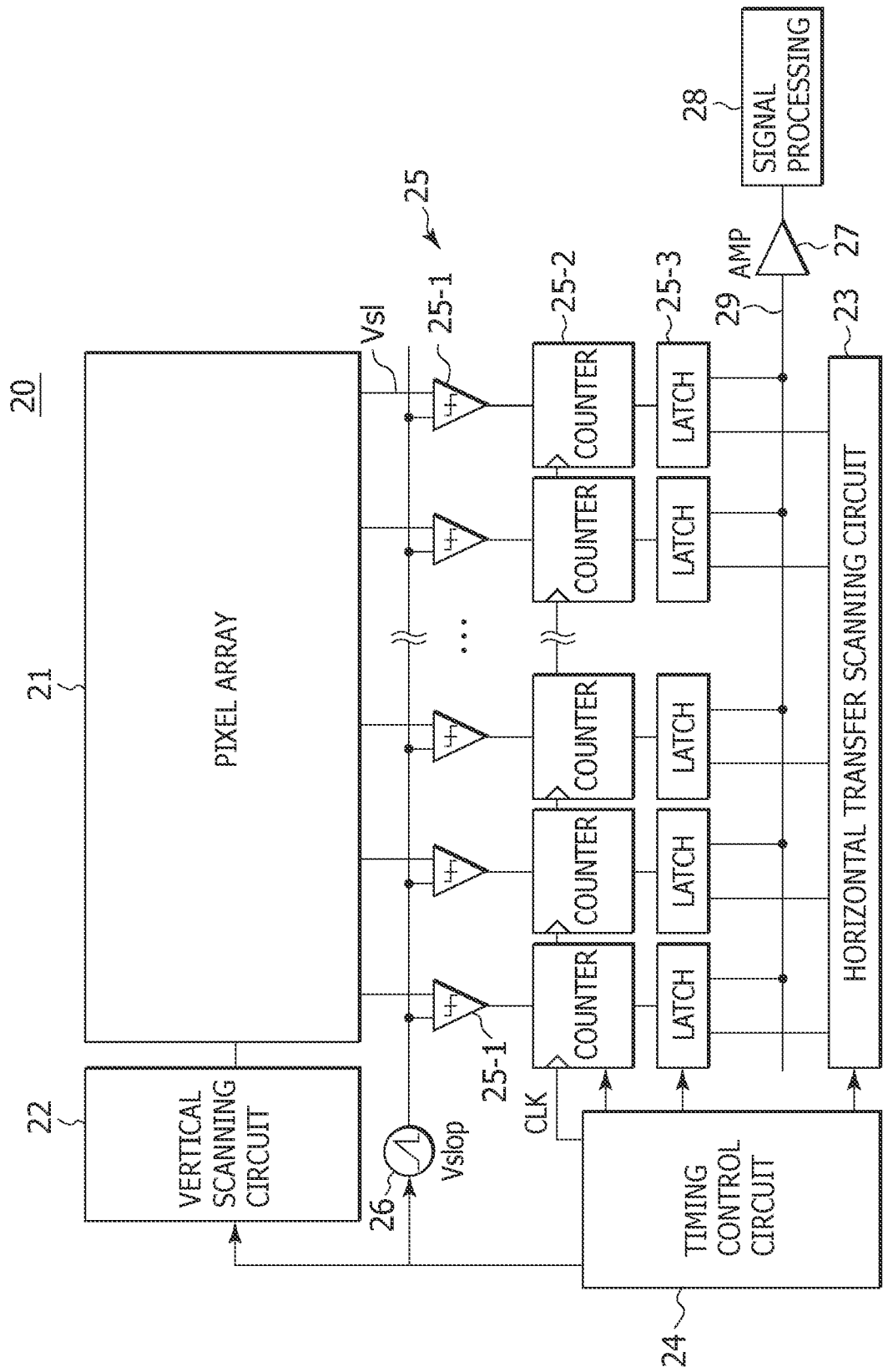
FIG. 2 is a block diagram showing a configuration example of a solid-state image pickup device (CMOS image sensor) including a column parallel ADC mounted thereon.

The pixel array 110 includes a photodiode and an amplifier within the pixel, and is configured to arrange the pixels shown in FIG. 1, for example, in a matrix manner.

The solid-state image pickup device 100 includes, as a control circuit for successively reading out a signal of the pixel array 110, the timing control circuit 140 for generating an internal clock, the vertical scanning circuit 120 for controlling a row address and row scanning, and the horizontal transfer scanning circuit 130 for controlling a column address and column scanning.

In the group of ADCs 150, ADCs formed of: comparators 151 for comparing a reference voltage Vslop which is a ramp waveform (RAMP) obtained by varying stepwise a reference voltage generated by DAC 160 and analog signals (potentials Vsl) obtained via passing through vertical signal lines from the pixel for each row line; counters 152 for counting a comparing time; and latches 153 for holding a count result are disposed in a plurality of columns.

The group of ADCs 150 has an n-bit digital signal conversion function and each of the ADCs is disposed for each vertical signal line (column line), thereby constituting column parallel ADC blocks.

The outputs of the respective latches 153 are coupled to a horizontal transfer line 190 having a width of 2n bits, for example.

Further, 2n of amplifier circuits 170 corresponding to the horizontal transfer line 190 and a signal processing circuit 180 are disposed.

In the group of ADCs 150, the analog signals (potentials Vsl) read out to the vertical signal lines are compared with the reference voltage Vslop (sloped waveform which changes to a linear shape having a certain gradient) at the comparators 151 disposed for each column.

At this time, the counters 152 disposed for each column similarly to the comparators 151 are operated, and when the reference voltages Vslop having a ramp waveform and counter values are changed on a one-to-one association basis, the potentials (analog signals) Vsl of the vertical signal lines are converted into a digital signal.

The change of the reference voltage Vslop is to convert a change in voltage into a change in time, and the time is counted in a certain cycle (clock), thereby performing a conversion into the digital value.

When the potential Vsl of an analog electrical signal and the reference voltage Vslop cross, the outputs of the comparators 151 are inverted to stop input clocks of the counters 152 or to input the clock of which the input is stopped into the counters 152. Thus, the AD conversion is completed.

After the above-described AD conversion period is ended, by the horizontal transfer scanning circuit 130, data held in the latches 153 are transferred to the horizontal transfer line 190, undergo the amplifier circuit 170, and are inputted to the signal processing circuit 180. As a result, a two-dimensional image is generated by a predetermined signal process.

In the group of ADCs 150 according to an embodiment of the present invention, a current concentration generated when performing a simultaneous parallel process may be alleviated to achieve a current smoothing, which enables inhibition of a power supply fluctuation. To achieve this, in the group of ADCs (pixel signal read-out circuit) 150, time periods over which the counters 152 operate are basically changed for each column (which means that time periods over which the counters 152 operate differ for each column).

More specifically, in the group of ADCs 150 of the embodiment, in the counters 152 disposed for each column, two types of circuits are implemented. One of the circuits is a circuit which operates until the outputs of the comparators 151 are inverted; and the other is a circuit which operates after the outputs of the comparators 151 are inverted.

In this case, the two types of counters different in operation are alternately disposed for each color.

Further, out of the counters different in operation, one is configured to perform an up-count operation and the other is configured to perform a down-count operation.

Hereinafter, a configuration of the group of ADCs (pixel signal read-out circuit) 150 having a characteristic configuration of the embodiment, in particular, a configuration and a function of the counters are described in detail.

Figure 7:
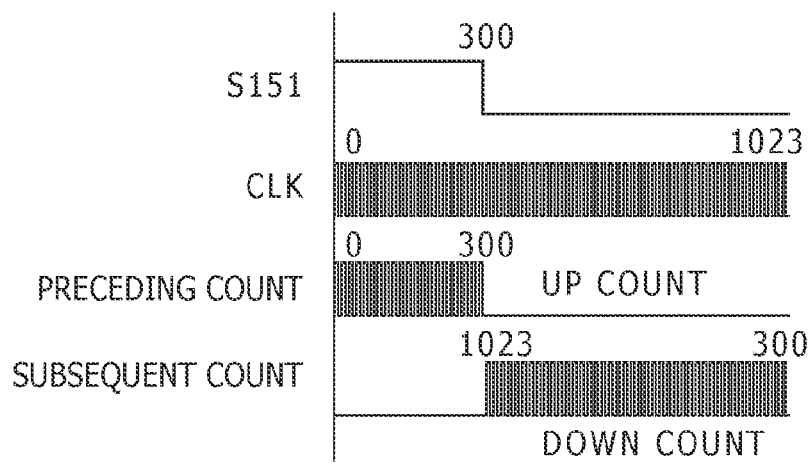
FIG. 7 is a diagram showing one example of an operation of the counter according to the embodiment.

FIG. 7 is a diagram showing one example of an operation of each counter according to an embodiment of the present invention.

A counter configuration (first counter) which takes a preceding count shown in FIG. 7 is configured to operate the counter 152 until a determination signal S151 of the comparator 151 arrives (until the output of the comparator 151 is inverted). A counter configuration (second counter) which takes a subsequent count is so configured to transmit the clock to the counter 152 after the determination signal S151 of the comparator 151 arrives (after the output signal of the comparator 151 is inverted).

Figure 8:
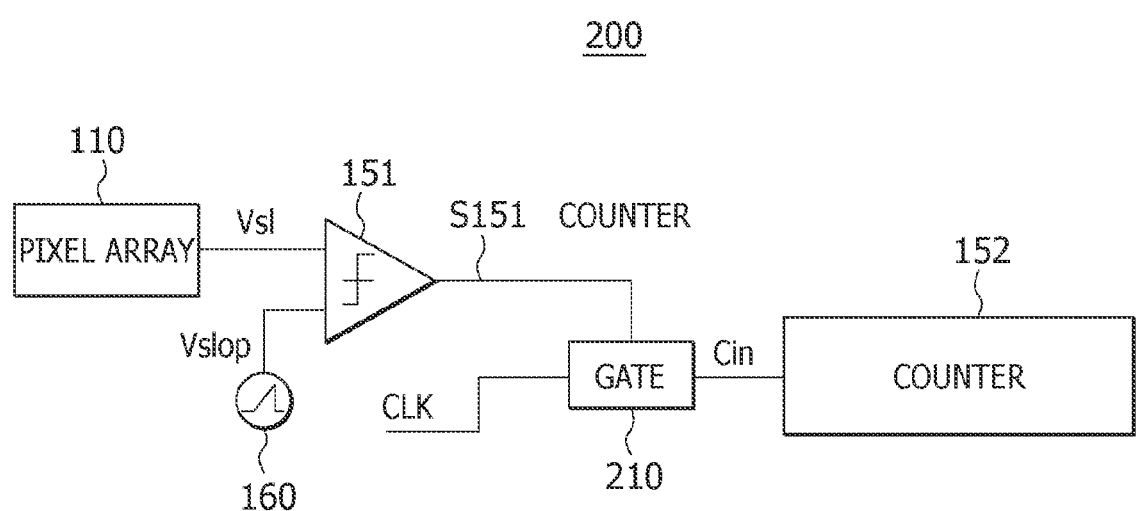
FIG. 8 is a diagram showing a configuration example of a clock transmission controlling unit according to the embodiment.

FIG. 8 is a diagram showing a configuration example of a clock transmission controlling unit according to an embodiment of the present invention.

A clock transmission controlling unit 200 includes a gate block unit 210 for controlling an input timing at which a clock CLK is inputted to the counter 152 in response to the determination signal S151 of the comparator 151.

The counters taking the preceding count and the counters taking the subsequent count are disposed in units of one or a plurality of columns. Accordingly, the gate block units 210 are disposed at input stages of the counters 152 in units of one or a plurality of columns.

FIGS. 9A and 9B are diagrams each showing a configuration example of the gate block unit 210 in FIG. 8.

In FIG. 9A, a gate block unit 210A includes a 2-input NOR gate 211.

The gate block unit 210A corresponds to the preceding count in which the counter 152 is operated until the determination signal S151 of the comparator 151 arrives (until the output of the comparator 151 is inverted).

In FIG. 9B, a gate block unit 210B includes a 2-input NAND gate 212.

The gate block unit 210B corresponds to the subsequent count in which the counter 152 is operated after the determination signal S151 of the comparator 151 arrives (after the output signal of the comparator 151 is inverted).

Instead of adopting a fixed arrangement as described above, it may configure to switch between the preceding count and the subsequent count corresponding to data set from outside to a register 141 disposed in the timing control circuit 140, for example, as shown in FIG. 10.

In an example of FIG. 10, blocks 213 having the 2-input NOR gate 211 and the 2-input NAND gate 212 are disposed. When the set data is low (L), the 2-input NOR gate 211 is selected so that the preceding count is performed, and when the set data is high (H), the 2-input NAND gate 212 is selected so that the subsequent count is performed.

In the configuration, in using the preceding count, the counter 152 is initialized to zero before operation, and the counter 152 starts the count, concurrently with transmission of the clock CLK.

At a time when the determination signal S151 which is the output of the comparator 151 is inverted, the counter 152 is stopped, and a value obtained at this time is held in the latch 153, whereby the AD conversion is performed.

In the example of FIG. 10, the output of the comparator 151 is inverted at 300th clock, and a value obtained at this time is held in the latch 153.

Subsequently, in using the subsequent count, before the operation, the counters 152 are initialized to all "1", i.e., in a case of 10 bits, initialized to 1023.

Thereafter, although the clock CLK is started to be inputted, the counter 152 is firstly stopped by the gate block unit 210.

The counter 152 is operated from a time when the output of the comparator 151 is inverted. At this time, the counter 152 performs a down-count operation. The counter 152 is stopped at a time when the clock arrives at the 1023 clocks, and thus, a value of the counter reaches 300.

Thus, in the embodiment, both the preceding count and the subsequent count are used. However, the configuration of the count is not limited thereto. The down-count operation may not be necessary in the subsequent count, and when the up-count operation is performed and a maximum value is subtracted at a subsequent processing block, a similar value may be obtained.

For example in FIG. 7, when the subsequent count uses an increasing mode (up system), the value of the counter is 723, and when a calculation of (1023−723) is carried out at a subsequent stage, 300 may be obtained.

A point in the embodiment is that the counters for the preceding count and the counters for the subsequent count are alternately disposed for each color as shown in FIG. 11.

An embodiment in FIG. 11 is configured so that adjacent same-color pixels have close values, and thus, the preceding count and the subsequent count are alternately performed by each two columns.

That is, in the embodiment of FIG. 11, corresponding to a plurality of adjacent pixel columns having an identical color series and having a close value, the preceding counters and the subsequent counters are alternately disposed for each of these pixel columns.

Herein, adjacent pixels generally have picture signals of a close level. Although there are an edge which rapidly change, unless a test pattern is concerned, an image in which white and black are changed one after the other on a pixel-by-pixel basis is not generated.

In the embodiment, a characteristic of such a picture signal is utilized to achieve a circuit for obtaining a current smoothing. The advantage is described in association with FIG. 12, FIG. 13, and FIG. 14.

Figure 12:
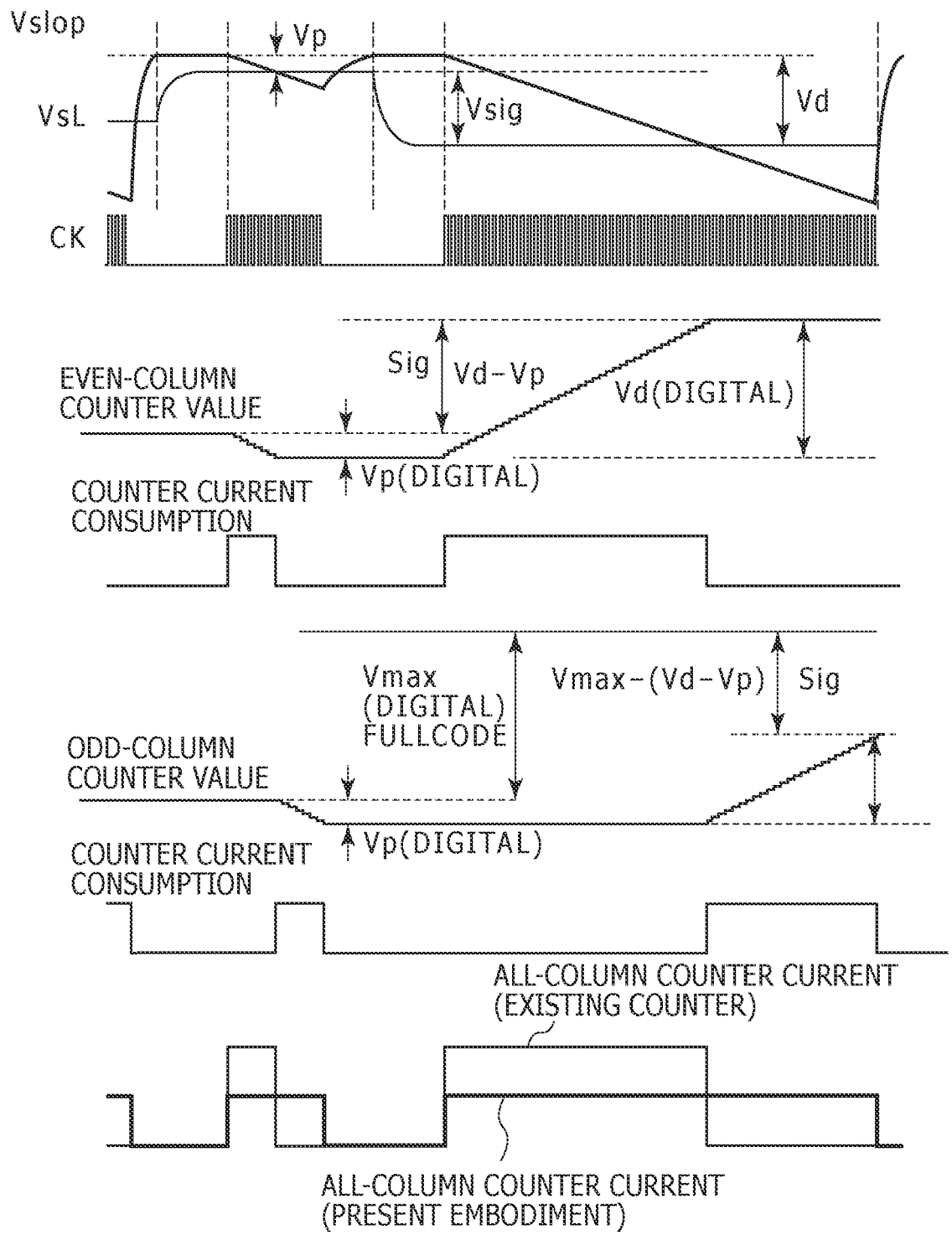
FIG. 12 is a chart showing an operation of a counter when a certain appropriate signal level (pixel signal) is inputted.

FIG. 12 is a chart showing an operation of the counter when an appropriate signal level (pixel signal) is inputted.

In FIG. 12, a description is given assuming that the preceding counter is disposed for each even column and the subsequent counter is disposed for each odd column.

Since in the even column, the preceding counter is disposed, the counter 152 is operated until the output of the comparator 151 is inverted, and during that operation, the current consumption is generated.

On the contrary, since in the odd column, the subsequent counter is disposed, the counter 152 is operated after the output of the comparator 151 is inverted, and during that operation, the current consumption is generated.

As shown in FIG. 12, with respect to a total current consumption of all columns when the same signals are inputted in a whole horizontal column, in an existing counter configuration, the currents are concentrated in a period until the comparator 151 is stopped in all the columns.

Contrary thereto, in a counter configuration of the embodiment, one-half of the counters are operated until the output of the comparator 151 is inverted, and the other half counters are operated after the output of the comparator 151 is inverted. Thus, the current consumption of the counters becomes a constant current during the AD conversion.

Figure 13:
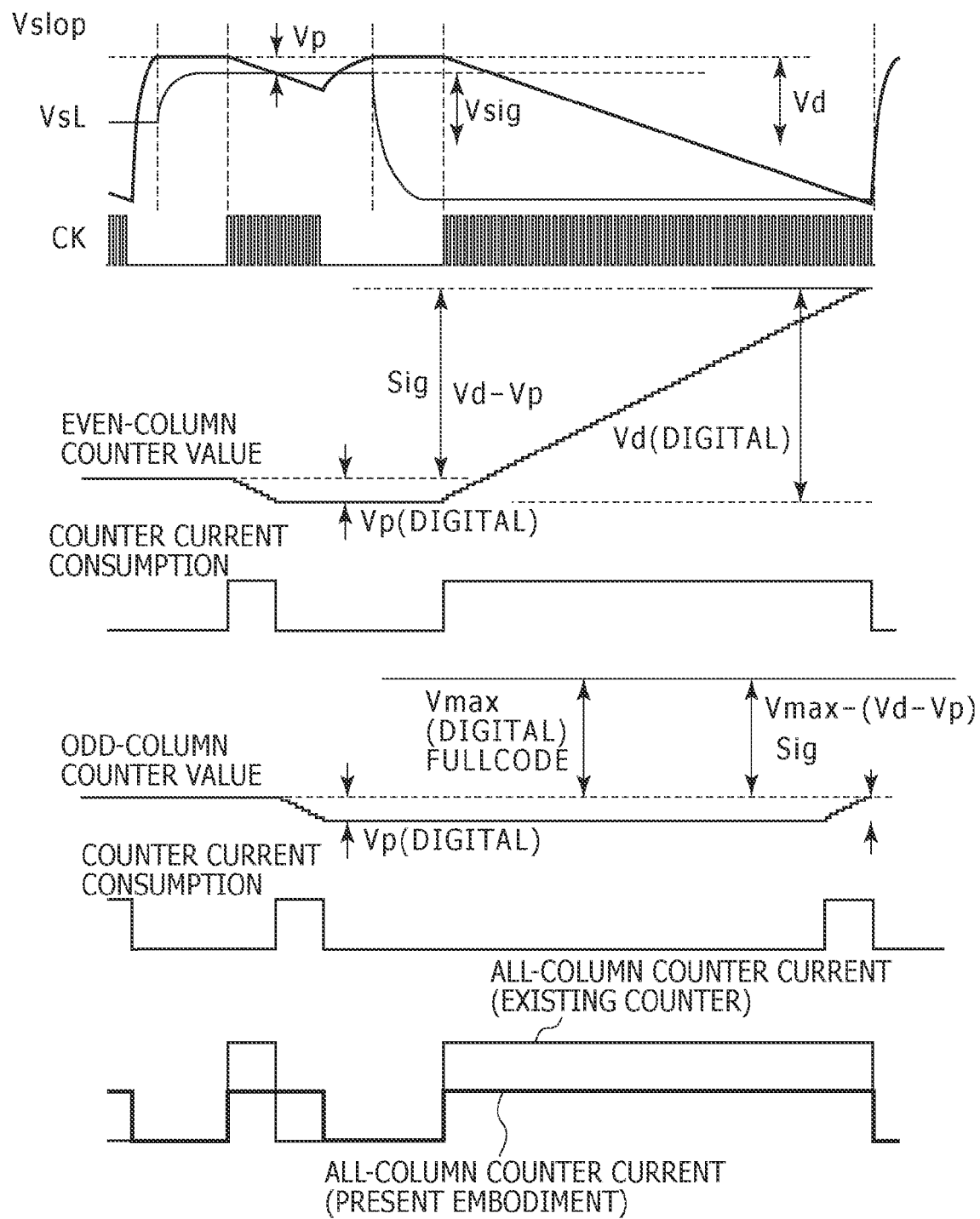
FIG. 13 is a chart showing an operation of the counter when a saturated level, i.e., a white-level signal, is inputted to all columns.

Subsequently, FIG. 13 is a chart showing an operation of the counter when a saturated level, i.e., a white-level signal, is inputted to all the columns.

In this case, the operation of the counter is the same as that described in FIG. 12. However, in the existing configuration, since the counter carries out a full count, the counter is constantly operated while all columns are AD-converted, and thus, the current consumption becomes maximum.

Contrary thereto, in the counter configuration according to the embodiment, one-half of the counters carry out a full count, but the other half thereof practically do not operate.

Accordingly, the current consumption of the counters, which is consumed in the whole columns, is reduced in nearly half of the existing counter configuration.

It should be noted here that as compared to the counter current consumption at a time of the appropriate input signal shown in FIG. 12, the current consumption of the counter varies corresponding to the input level in the existing system, and in the counter configuration of the embodiment, however, a read-ahead counter and a read-behind counter compensate each other the time period during over the current is consumed. As a result, the current consumption is kept nearly constant.

Figure 14:
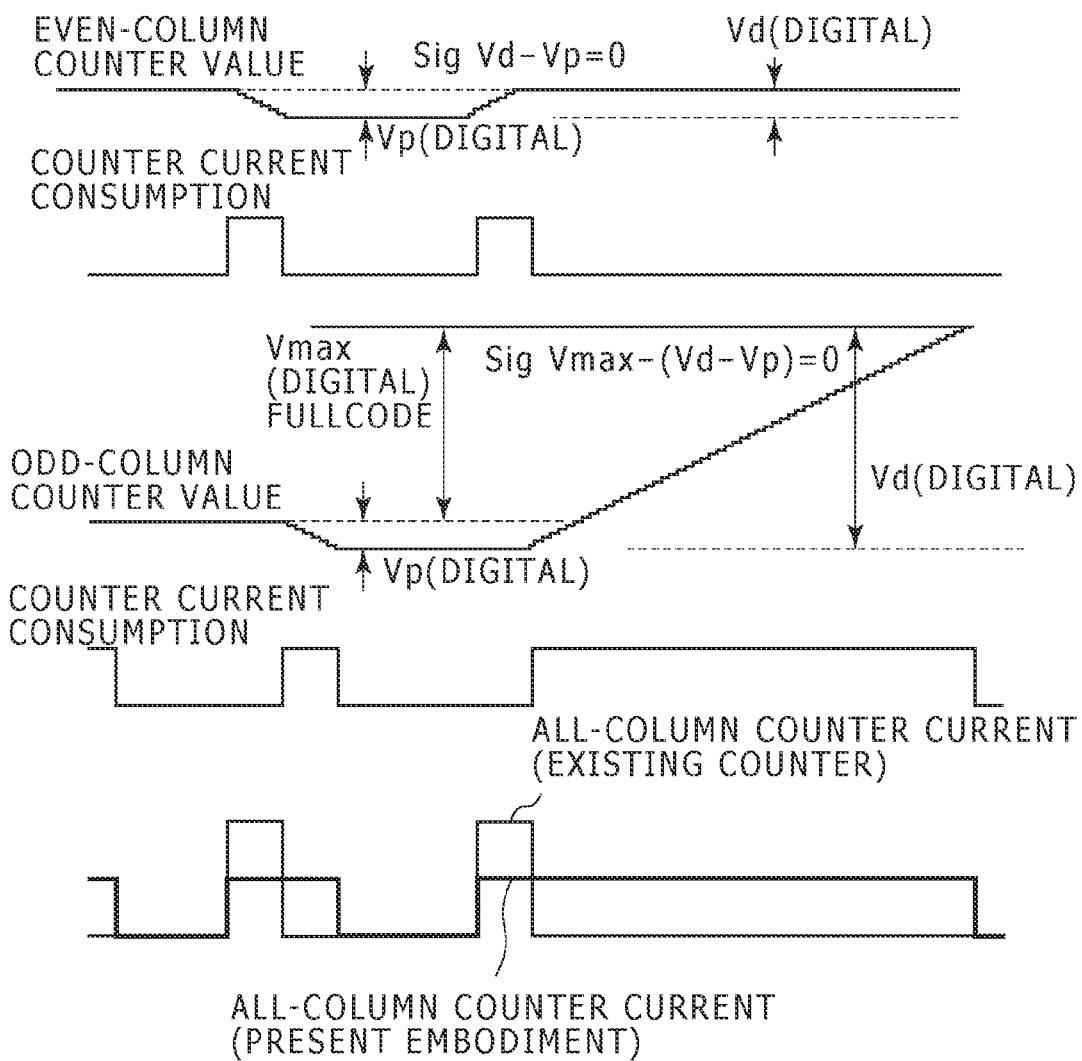
FIG. 14 is a chart showing an operation of the counter when there is nearly no input signal, i.e., a black-level signal, is inputted in all the columns.

FIG. 14 is a chart showing an operation of the counter when there is nearly no input signal, i.e., a black-level signal, is inputted in all the columns.

In this case, in the existing system, the output of the comparator 151 is immediately inverted, and thus, the operation period of the counter is short and the current consumption of all the counters is reduced.

Contrary thereto, the counter current consumption in the embodiment is almost the same as a case of the input signal described in association with FIG. 12 and FIG. 13.

As compared to the current consumption when the black-level signal is read out, the current consumption increases than that of the existing counter configuration. However, given the picture signal, reading only the black level means that no picture information is provided, and thus, the reading out like this is not to be performed continuously.

Contrary to the existing system in which when there is the picture signal, the current consumption varies according to the level, in the group of ADCs 150 which is the pixel signal read-out circuit of the embodiment, the current consumption may be controllable nearly without relying on the signal level.

Up to this, to simplify the description, the description is given of the case where the same signal is simultaneously inputted to all the columns.

However, in an actual picture signal, signals inputted in a horizontal direction, i.e., in the respective columns, are differed.

Figure 15:
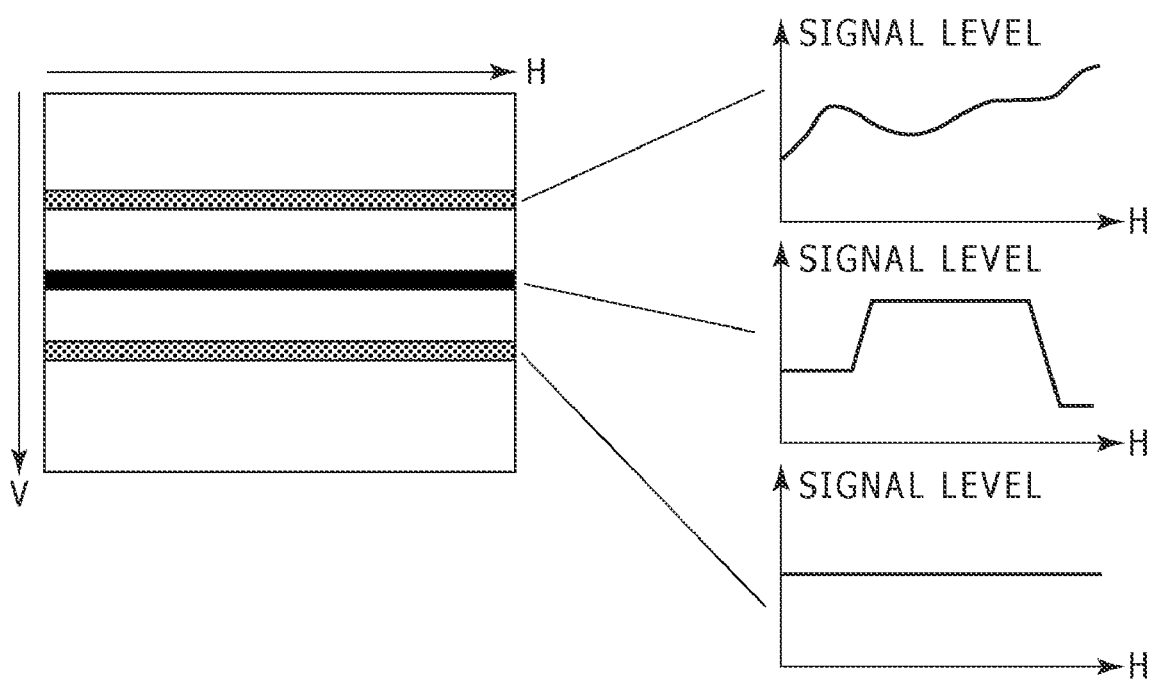
FIG. 15 is a chart showing one example of a conversion of a signal in a horizontal direction and a vertical direction when one piece of image is obtained.

FIG. 15 is a chart showing one example of a conversion of a signal in a horizontal direction and a vertical direction when one piece of image is obtained.

As shown in FIG. 15, a normal signal level changes in a horizontal direction and a vertical direction.

Figure 3:
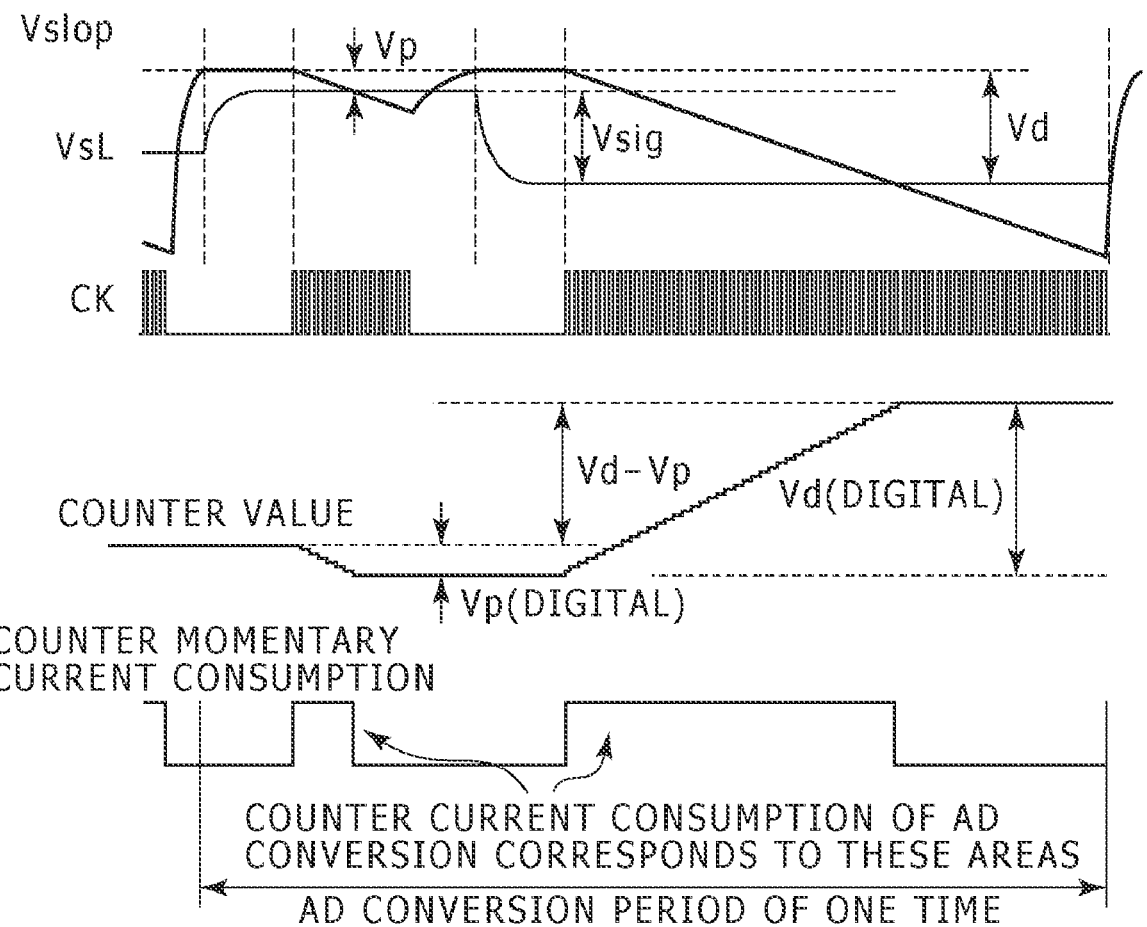
FIG. 3 is a chart for describing an operation of a counter and a current consumed by the counter, and is a chart showing a state in a scene where an imaged subject is relatively bright.

The reading out in the horizontal direction is simultaneously performed, and thus, unless the current consumption of the circuit is constant even when the signal is in a pattern of any form in the horizontal direction, the current consumed in the circuit, as shown in FIG. 3 and FIG. 4, is differed in the reading out in the vertical direction. As a result, the power supply fluctuation is caused.

From this onward, an advantage of an embodiment of the present invention is described by using an actual case where the signals in the horizontal direction also differ in the respective columns.

Figure 16A:
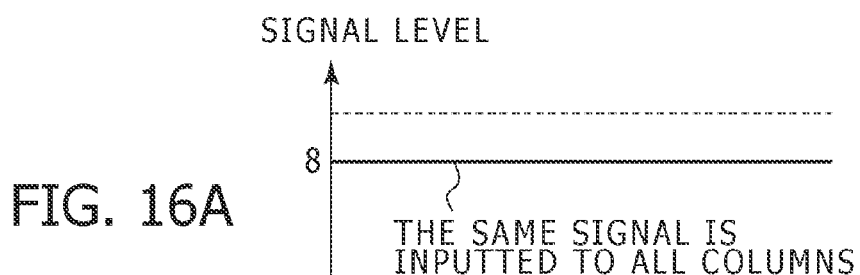
FIGS. 16A, 16B, and 16C are charts for describing a case where white-level signals are uniformly inputted to the column.
Figure 16B:
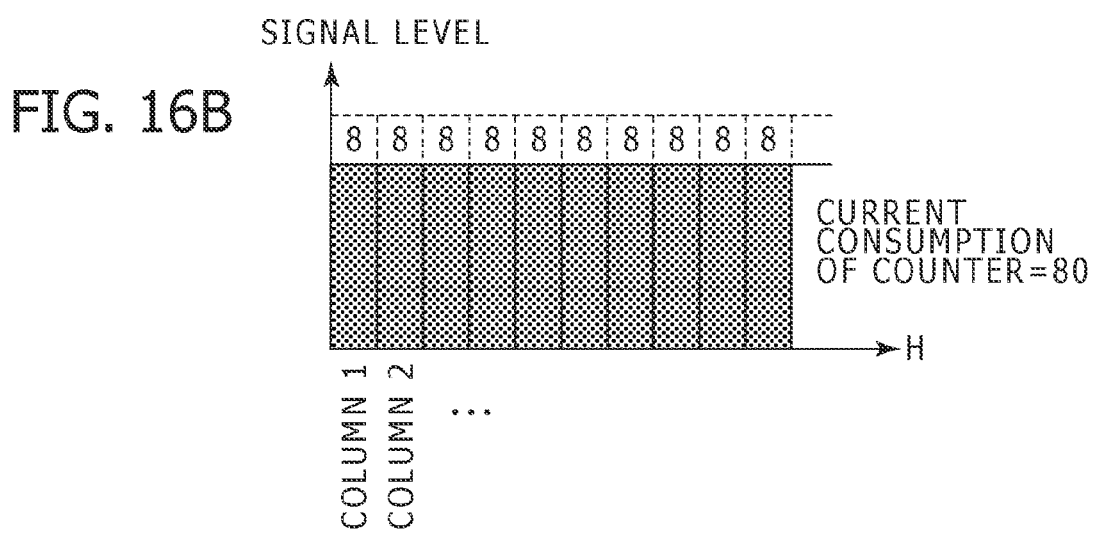
Figure 16C:
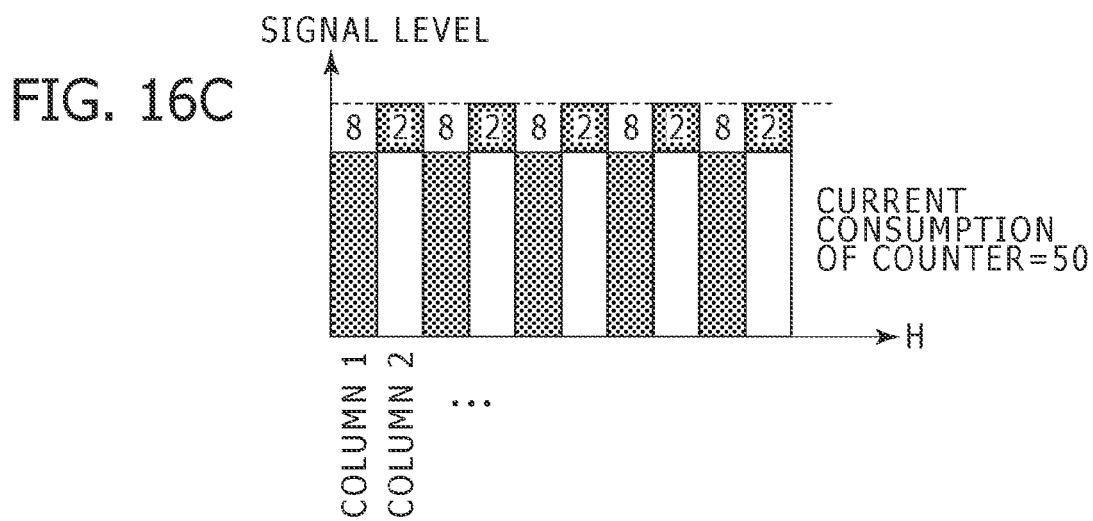

Firstly, as shown in FIGS. 16A to 16C, a description is given of a case where white-level signals are inputted uniformly in the columns.

In the counter, the current consumption varies linearly according to an operation time. That is, the current consumption is changed linearly according to an amount of signal. In this case, a description is given such that a maximum of the signal is set to 10, and the amount of signal is directly used as the current consumption.

In an example of a current consumption of an existing circuit shown in FIG. 16B, in which signals of 8 near the white level are uniformly inputted to the respective columns, the number of columns is 10. Thus, the current consumption of 80 is obtained.

Contrary thereto, in the circuit according to an embodiment of the present invention shown in FIG. 16C, the subsequent count circuits are disposed in every other column, and after the output of the comparator 151 is inverted, the counting is performed. Thus, when the signal of 8 is inputted, the counting from 8 to 10 is performed.

Accordingly, the current to be consumed is 2. This is alternately disposed for each color, and thus, the current consumption of the whole columns is 50.

Figure 17A:
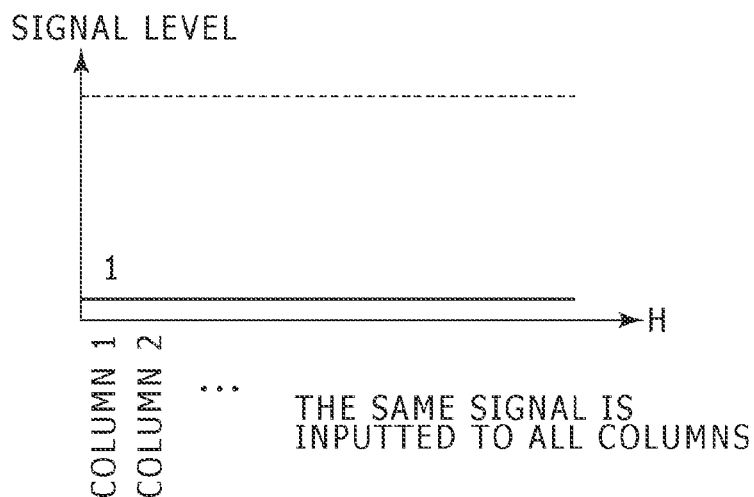
FIGS. 17A, 17B, and 17C are charts for describing a case where signals of 1 near a black level are uniformly inputted to columns.
Figure 17B:
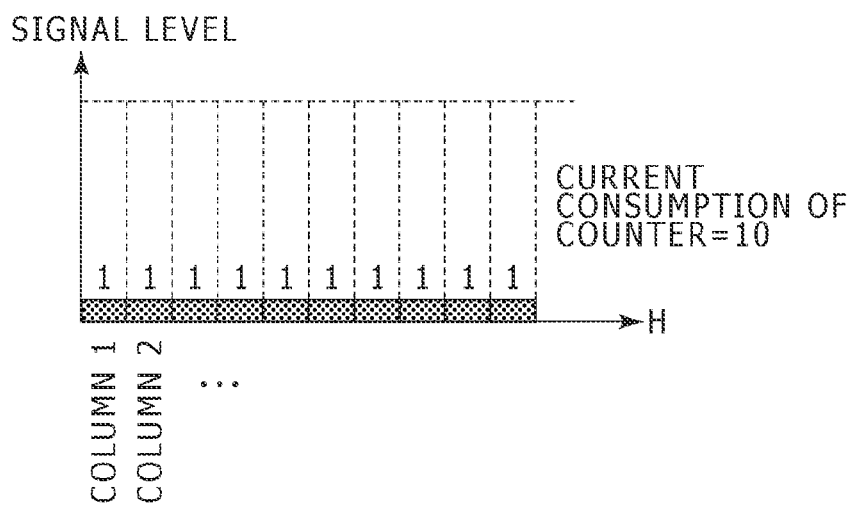
Figure 17C:
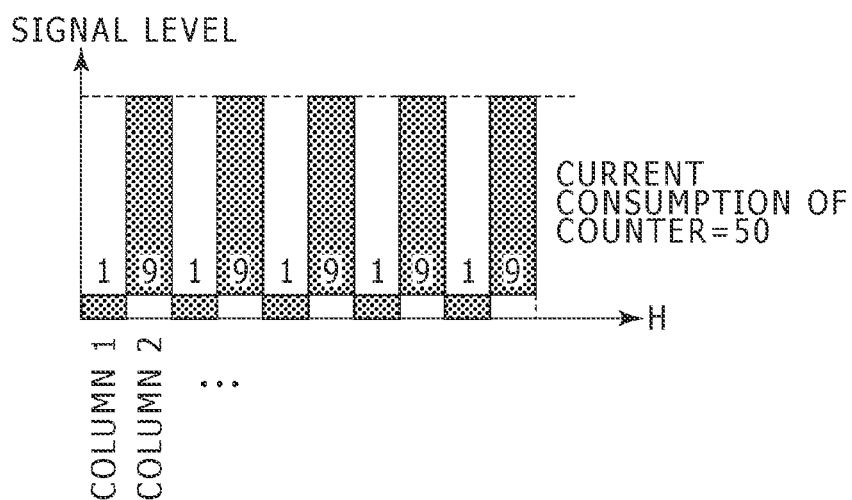

Subsequently, as shown in FIGS. 17A to 17C, a case where signals of 1 near a black level are inputted uniformly to the columns is examined.

When viewed in a similar manner, in the existing system shown in FIG. 17B, a total column current consumption is 10. It is understood that as compared to the case where the signals of 8 near the white level shown in FIG. 16B are inputted, the current is significantly changed.

Contrary thereto, as shown in FIG. 17C, the current consumption in the circuit according to an embodiment of the present invention is 50, which is the same as that when the white level shown in FIG. 16C is read out, and the current fluctuation is not generated.

Thus far, the advantage of an embodiment of the present invention in the case where the uniform input is made to the columns is described, which is a content described thus far.

Figure 18A:
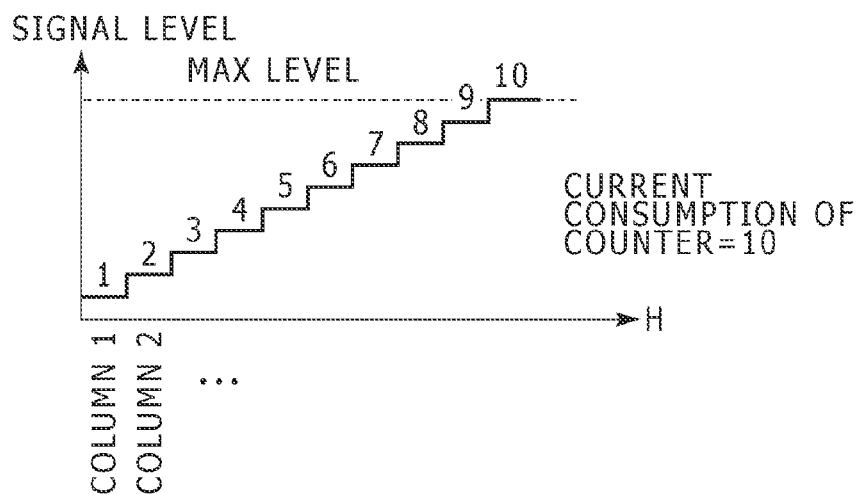
FIGS. 18A, 18B, and 18C are charts for describing a case where not uniform signals but signals which change in a horizontal direction are inputted to the columns.
Figure 18B:
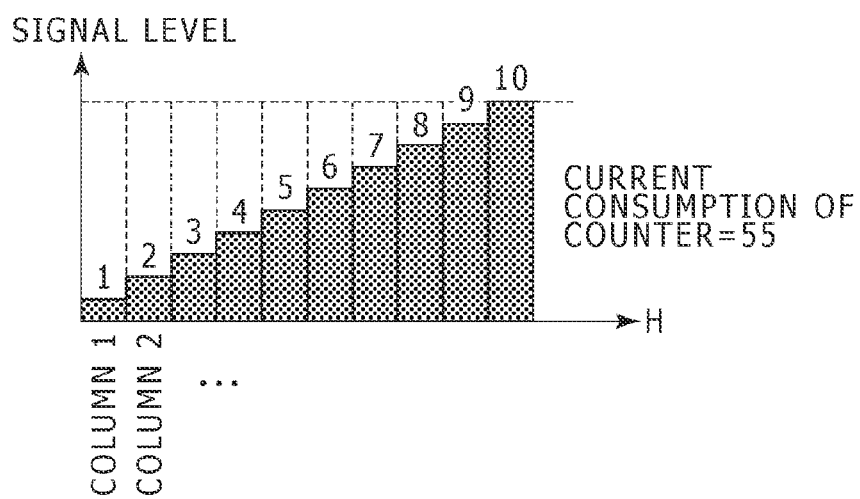
Figure 18C:
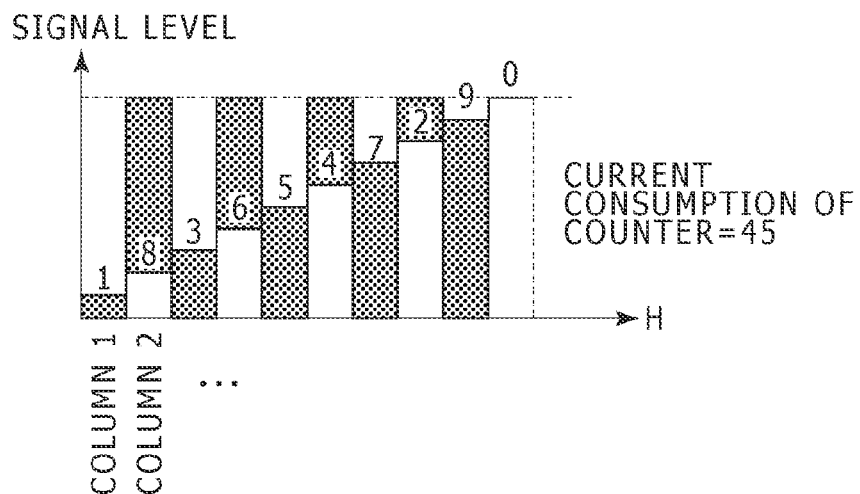

Subsequently, as shown in FIGS. 18A to 18C, a case where not the uniform signals but signals changing in a horizontal direction are inputted to the columns is considered.

As shown in FIG. 18B, the current consumption in the existing circuit is 55, which is a value different from those of reading out the white level and the black level.

Contrary thereto, the current consumption in the circuit according to an embodiment of the present invention is 45. It is understood that this value is nearly the same as that of the current consumption achieved at the time of reading out the white level and the black level, and is constant.

Figure 19A:
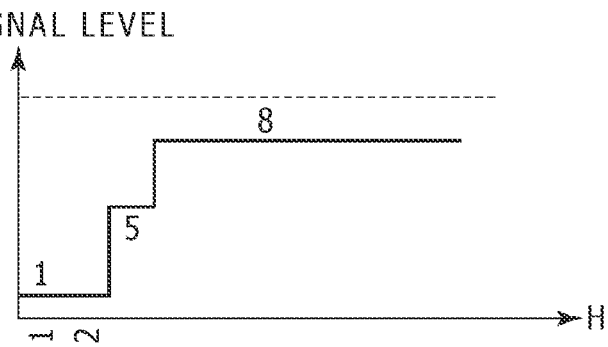
FIGS. 19A, 19B, and 19C are charts for describing a case where there is input in which the signal changes (edges) from black to white.
Figure 19B:
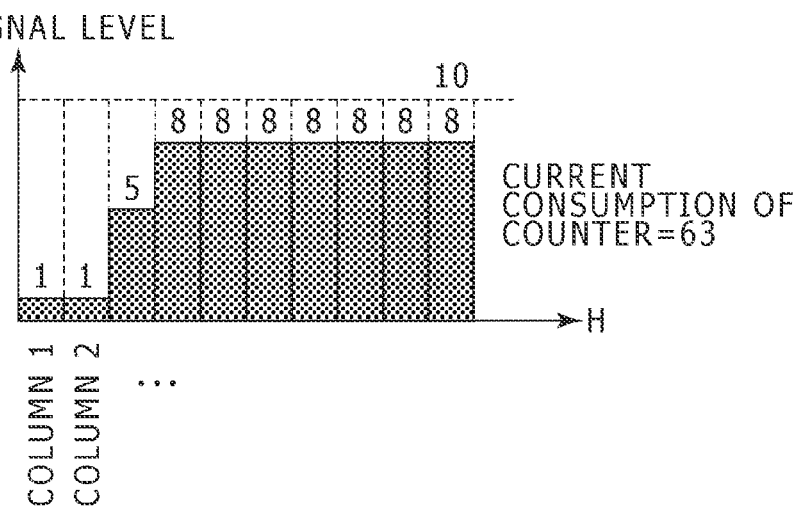
Figure 19C:
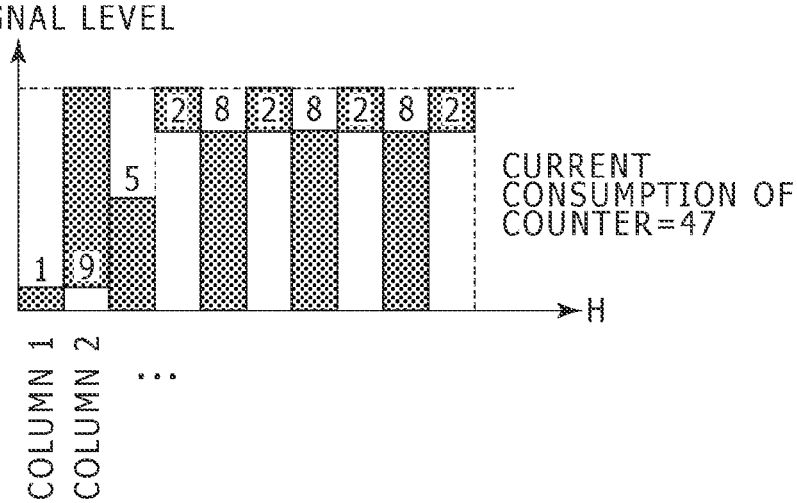

Further, as shown in FIGS. 19A to 19C, a case where there is input in which the signal changes (edges) from black to white is considered.

As shown in FIG. 19B, it is understood that the current consumption in the existing circuit is 63, which means the current consumption is changed according to an amount of signal, and on the other hand, in the circuit according to an embodiment of the present invention, the current consumption is 47, which is a value nearly equivalent to the current consumption in the other cases.

Figure 20:
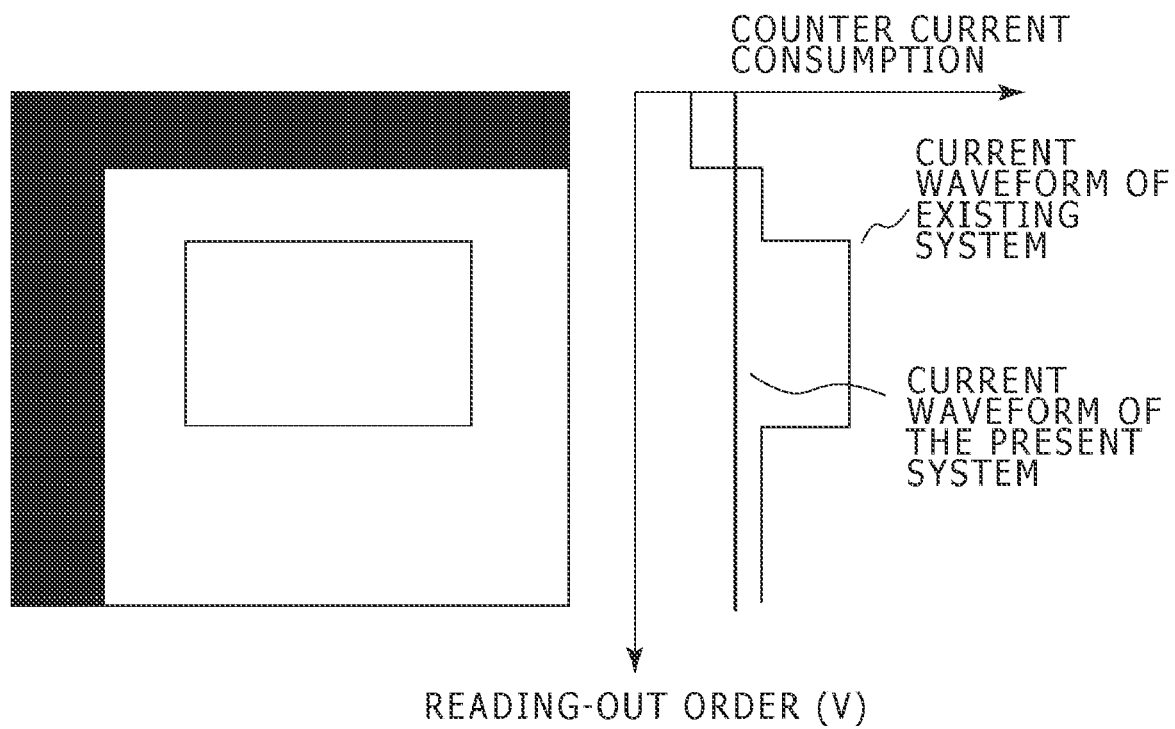
FIG. 20 is a diagram, which shows one example of a certain image, showing an example of an image near a scene in which there is a window in a dark room and outside the window, it is bright, which gives an impression of staying near a white level.

FIG. 20 is a diagram, which shows one example of an image, showing an example of an image near a scene in which there is a window in a dark room and outside the window, it is bright, which gives an impression of staying near the white level.

With respect to the current consumed by the counter in the reading out in a vertical (V) direction, the current increases in the rows with many white colors and the current decreases in the rows with many black colors, and thus, the current fluctuation is generated.

Contrary thereto, in a system according to an embodiment of the present invention, as described thus far, the current is kept nearly constant, and thus, no current fluctuation is generated.

When the counter according to an embodiment of the present invention is used in every scene as described above, it may keep the current consumption constant. Although the current fluctuation has hitherto been relied upon an external capacitance of IC, the characteristic may be improved without this reliance.

In particular, in mounting a small device such as a mobile device, the embodiment provides an advantage in external capacitance reduction.

Figure 21:
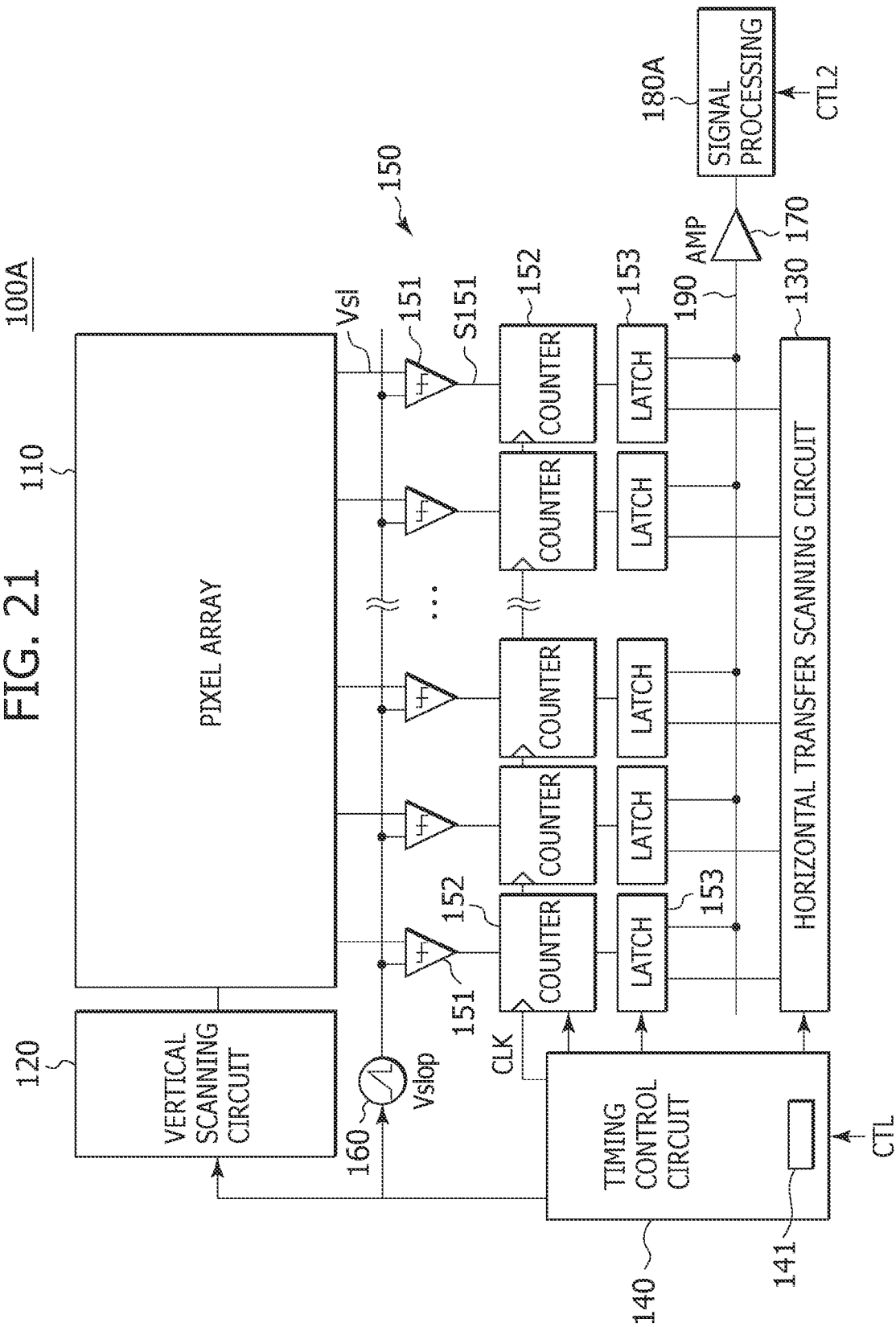
FIG. 21 is a block diagram showing a configuration example of a solid-state image pickup device (CMOS image sensor) including a column parallel ADC mounted thereon according to a second embodiment of the present invention.

FIG. 21 is a block diagram showing a configuration example of a solid-state image pickup device (CMOS image sensor) including a column parallel ADC mounted thereon according to a second embodiment of the present invention.

A solid-state image pickup device 100A in FIG. 21 is configured to concentrate the image signal process of a signal processing circuit 180A in a time period other than the counter operation period.

In a column parallel processing image sensor, one time of AD conversion is performed for each row, and in the one time of AD conversion, the current consumption varies for each row. In the first embodiment, there is described that this problem may be solved.

In the second embodiment, an issue of the current fluctuation during the AD conversion may further be solved.

Figure 22:
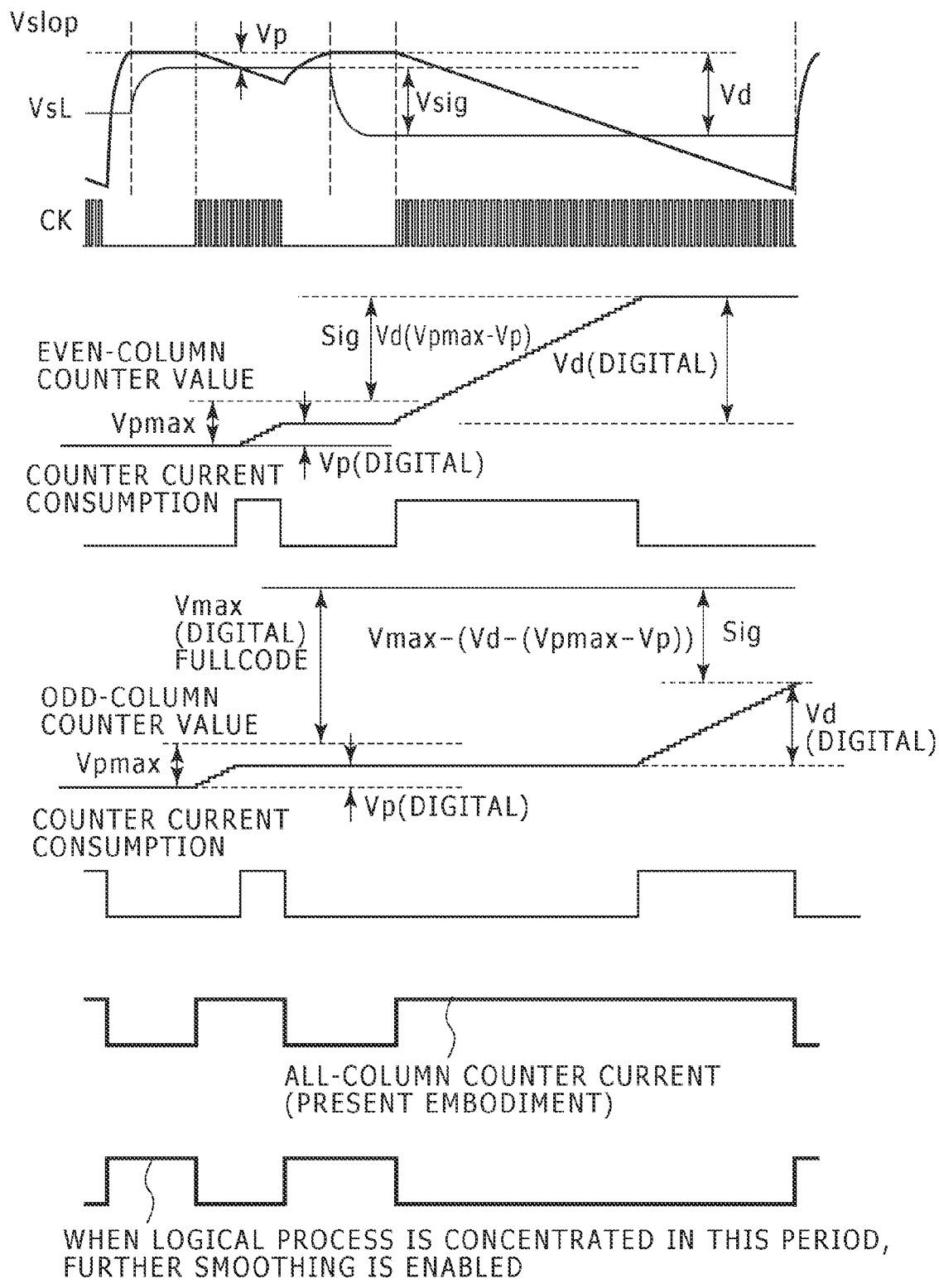
FIG. 22 is a chart for describing a characteristic of the second embodiment.

FIG. 22 is a chart for describing a characteristic of the second embodiment.

As shown in FIG. 22, it is obvious that in the first embodiment, a shape of the instantaneous current consumption of the counter, which is consumed in all the columns, may be uniform in every scene. This capability enables the current consumption of the one time of AD conversion to be constant.

Herein, the counter as such is not constantly operated during the one time of AD conversion. There is a settling period until the vertical signal line potential Vsl shown in FIG. 22 is settled. In the settling period, the instantaneous current consumption of the counter becomes zero.

In the first embodiment, the waveform of the counter instantaneous current of a total of all the columns is controlled to permit a uniform instantaneous current waveform shown in the figure even when the signal of any form is inputted. This is utilized in the second embodiment. As shown in FIG. 22, in a time period over which the instantaneous current of the counter is zero, the processing period of the signal processing circuit 180A is concentrated by controlling by a control signal CLT2, for example. As a result, a further current smoothing may be achieved in the one time of AD conversion period.

As described above, according to embodiments of the present invention, there are provided: the pixel array 110 including a plurality of pixels arranged in a matrix and for performing a photoelectric conversion; and the pixel-signal read-out circuit (group of ADCs) 150 for reading out the data in units of rows from the pixel array 110. The group of ADCs (pixel-signal read-out circuit) 150 includes: the plurality of comparators 151, disposed to correspond to a column arrangement of the pixels, for determining by comparing a read-out signal potential and a reference voltage to generate a determination signal, and outputting the determination signal; and the plurality of counters 152 controlled by outputs of the comparators, for counting comparison times of the corresponding comparators. When the read-out signal potential Vsl and the reference voltage Vslop cross, the outputs of the comparators 151 are inverted to stop input clocks of the counters 152 or to input the clock of which the input is stopped into the counters 152. The counters 152 differ in operation period in units of one or a plurality of columns. More specifically, in the counters 152 disposed for each column, there are provided: the counters operated until the outputs of the comparator 151 are inverted; and the counters operated after the outputs of the comparators 151 are inverted. Thus, the following advantage may be obtained.

That is, the current consumed by the image sensor may be smoothed, and thus, a load of a power supply IC may be reduced.

The current smoothing eliminates a need of the power supply smoothing by an external capacitance, and thus, an effect is exhibited in miniaturizing or reducing an externally-attached component.

Contrary to the existing circuit, in the read-out circuit according to an embodiment of the present invention, a problem of a power supply variation only is solved without increasing a circuit size, and a tradeoff with the circuit size and the current consumption is not generated.

Since the current consumption is not changed by a gain changed according to the brightness, not only the current smoothing in reading out one piece of image but also the current fluctuation caused due to a change in scene may be inhibited.

The instantaneous current of the counter may be smoothed during the operation period, and thus, the current fluctuation is small, and a noise circulation into the analog block is varied. Thus, a noise characteristic (endurance) of the read-out circuit may be improved.

The number of counters to be operated may be reduced to nearly half during the AD conversion period, and the maximum current consumption of the counter in the one time of AD conversion may be reduced in half of the existing circuit. Thus, a load of the circuit in a repeated operation may be decreased.

A solid-state image pickup device having such an advantage may be applied as an imaging device of a digital camera or a video camera.

Figure 23:
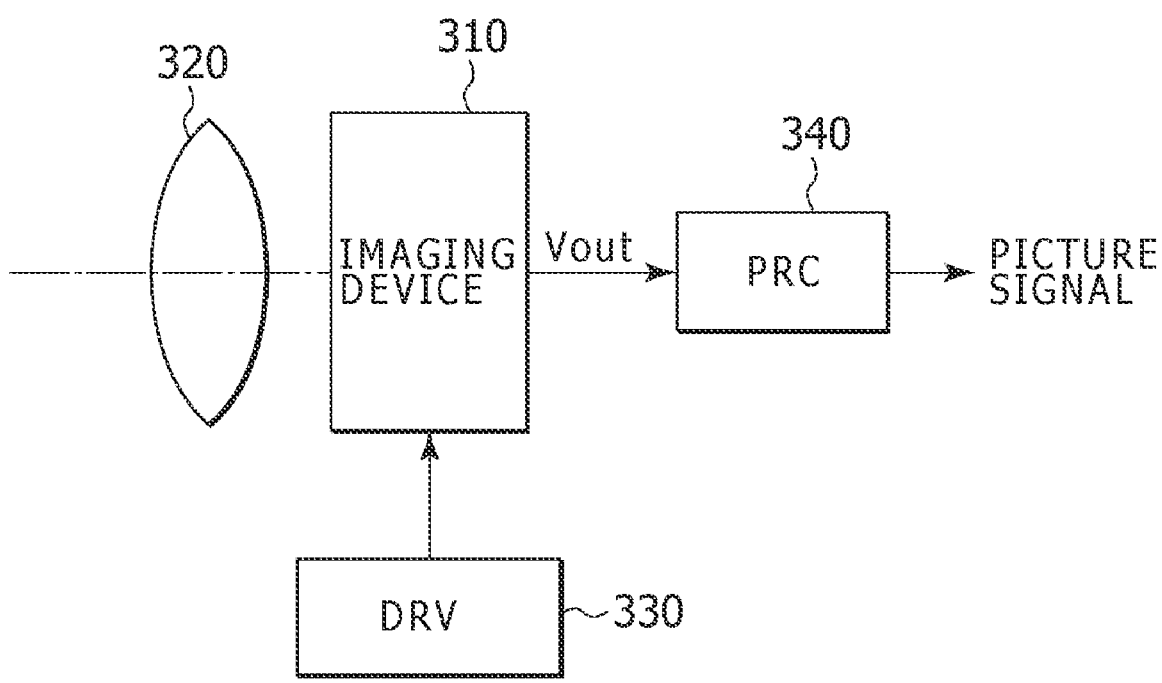
FIG. 23 is a diagram showing one example of a configuration of a camera system to which the solid-state image pickup device according to an embodiment of the present invention is applied.

FIG. 23 is a diagram showing one example of a configuration of a camera system to which the solid-state image pickup device according to embodiments of the present invention is applied.

As shown in FIG. 23, a camera system 300 includes: an imaging device 310 to which the solid-state image pickup device 100 according to an embodiment is applicable; an optical system for guiding (for imaging an imaged subject) an incident light to a pixel region of the imaging device 310, for example a lens 320 for imaging the incident light (image light) onto an imaging surface; a drive circuit (DRV) 330 for driving the imaging device 310; and a signal processing circuit (PRC) 340 for processing an output signal of the imaging device 310.

The drive circuit 330 includes a timing generator (not shown) for generating various timing signals including a start pulse or a clock pulse for driving a circuit within the imaging device 310, and drives the imaging device 310 by a predetermine timing signal.

The signal processing circuit 340 applies a signal process such as a CDS (Correlated Double Sampling) to the output signal of the imaging device 310.

The image signal processed by the signal processing circuit 340 is recorded in a recording medium such as a memory. Image information recorded in the recording medium is printed in a hard copy by a printer, etc. The image signal processed by the signal processing circuit 340 is projected as a moving picture on a monitor formed of a liquid crystal display, etc.

As described above, in the image pickup device such as a digital still camera, when the solid-state image pickup device 100 is implemented as the imaging device 310, a highly sophisticated camera may be achieved.

It should be understood by those skilled in the art that various modifications, combinations, sub-combinations and alternations may occur depending on design requirements and other factors insofar as they are within the scope of the appended claims or equivalents thereof.

What is claimed is:

1. A solid-state image pickup device, comprising:
 a pixel array including a plurality of pixels arranged in a matrix, each of the pixels being configured to perform photoelectric conversion; and
 a pixel signal read-out circuit for reading out a pixel signal from the pixel array in units of pixels, the pixel signal read-out circuit including
   (a) a plurality of comparators, each comparator corresponding to a respective column of the pixels, each comparator being configured to compare a read-out signal potential and a reference voltage to generate a determination signal and output the determination signal; and
   (b) a plurality of counters whose operations are respectively controlled by outputs of the comparators, each of the counters being configured to count a comparison time of a respective comparator,
 wherein,
   the plurality of counters have different operation periods for one or a plurality of the columns,
   each of the comparators is configured to invert an output level when the read-out signal potential agrees with the reference voltage, and
   the plurality of counters, corresponding to respective columns, having different operation periods that include:
     (i) first counters each configured to operate until an output of the corresponding comparator is inverted; and
     (ii) second counters each configured to operate after an output of the corresponding comparator is inverted.

2. The solid-state image pickup device according to claim 1, wherein the first counters and the second counters are alternately disposed for each color.

3. The solid-state image pickup device according to claim 1, wherein the first counters and the second counters are alternately disposed for each of the pixel columns to correspond to a plurality of pixel columns which are adjacent same color series.

4. The solid-state image pickup device according to claim 1, wherein one of the first counter and the second counter performs an up-count operation, and the other thereof performs a down-count operation.

5. The solid-state image pickup device according to claim 4, wherein:
 the pixel signal read-out circuit includes a clock transmission controlling unit for controlling a transmission of a clock to the first counter or the second counter,
 when a clock of the first counter is transmitted, the clock transmission controlling unit transmits the clock until the output of the comparator is inverted, and stops the transmission of the clock in response to the inversion of the output of the comparator, and
 when a clock of the second counter is transmitted, the clock transmission controlling units stops the transmission of the clock until the outputs of the comparator is inverted and transmits the clock in response to the inversion of the output of the comparator.

6. The solid-state image pickup device according to claim 1, wherein:
 the pixel signal read-out circuit includes a clock transmission controlling unit for controlling a transmission of a clock to the first counter or the second counter,
 when a clock of the first counter is transmitted, the clock transmission controlling unit transmits the clock until the output of the comparator is inverted, and stops the transmission of the clock in response to the inversion of the output of the comparator, and
 when a clock of the second counter is transmitted, the clock transmission controlling units stops the transmission of the clock until the output of the comparator is inverted, and transmits the clock in response to the inversion of the output of the comparator.

7. A camera system, comprising:
 a solid-state image pickup device; and
 an optical system for imaging a subject image onto the image pickup device,
 wherein,
   (1) the solid-state image pickup device includes
     (a) a pixel array in which a plurality of pixels are arranged in a matrix, each of the pixels being configured to perform photoelectric conversion; and
     (b) a pixel signal read-out circuit for reading out a pixel signal from the pixel array in units of pixels,
   (2) the pixel signal read-out circuit includes
     (a) a plurality of comparators, each comparator corresponding to a respective column of the pixels, each of the comparators being configured to compare a read-out signal potential and a reference voltage to generate a determination signal and output the determination signal; and
     (b) a plurality of counters whose operations are respectively controlled by outputs of the comparators, each of the counters being configured to count a comparison time of a respective comparator, and
   (3) the plurality of counters have different operation periods for one or a plurality of the columns,
   (4) the comparators invert an output level when the read-out signal potential agrees with the reference voltage, and
   (5) the plurality of counters, corresponding to respective columns, have different operation periods that include:
     (i) first counters each configured to operate until an output of the corresponding comparator is inverted; and
     (ii) second counters each configured to operate after an output of the corresponding comparator is inverted.

* * * * *